(12) United States Patent
Ji et al.

(10) Patent No.: US 9,961,210 B2
(45) Date of Patent: May 1, 2018

(54) TERMINAL, SERVER, AND TERMINAL CONTROL METHOD

(71) Applicant: Huawei Technologies Co., Ltd., Shenzhen, Guangdong (CN)

(72) Inventors: Hao Ji, Nanjing (CN); Defeng Bu, Nanjing (CN); Xianjun Zou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days. days.

(21) Appl. No.: 15/501,698

(22) PCT Filed: Aug. 4, 2014

(86) PCT No.: PCT/CN2014/083643
§ 371 (c)(1),
(2) Date: Feb. 3, 2017

(87) PCT Pub. No.: WO2016/019495
PCT Pub. Date: Feb. 11, 2016

(65) Prior Publication Data
US 2017/0230510 A1    Aug. 10, 2017

(51) Int. Cl.
*H04M 3/00*  (2006.01)
*H04M 11/00*  (2006.01)
*H04M 1/02*  (2006.01)
*H04W 72/04*  (2009.01)
*H04L 12/741*  (2013.01)
*H04W 12/04*  (2009.01)
(Continued)

(52) U.S. Cl.
CPC ......... *H04M 11/007* (2013.01); *G06F 3/0488* (2013.01); *G10L 15/265* (2013.01); *H04L 45/54* (2013.01); *H04M 1/0202* (2013.01); *H04W 12/04* (2013.01); *H04W 72/0453* (2013.01)

(58) Field of Classification Search
CPC ............ H04M 11/007; H04M 1/0202; H04W 72/0453; H04W 12/04; H04L 45/54; G06F 3/0488; G10L 15/265
USPC ........................ 455/419, 418, 420
See application file for complete search history.

(56) References Cited

U.S. PATENT DOCUMENTS

| 7,206,548 B1 | 4/2007 | Sumler et al. |
| 2009/0077184 A1 | 3/2009 | Brewer et al. |
| 2011/0113345 A1 | 5/2011 | Choi |

(Continued)

FOREIGN PATENT DOCUMENTS

| CN | 102378257 A | 3/2012 |
| CN | 102710869 A | 10/2012 |

(Continued)

*Primary Examiner* — Khai M Nguyen

(57) ABSTRACT

Embodiments of the present invention provide a terminal, a server, and a terminal control method. A control channel and a data channel are established to a controlled terminal, screen image data that is sent by the controlled terminal by using the data channel is received, a screenshot of the controlled terminal is displayed according to the screen image data, and corresponding operation information is generated according to an operation that is based on the screenshot and is sent to the controlled terminal by using the control channel, so that the controlled terminal performs the corresponding operation according to the operation information.

11 Claims, 15 Drawing Sheets

(51) Int. Cl.
    *G06F 3/0488*    (2013.01)
    *G10L 15/26*    (2006.01)

(56) References Cited

U.S. PATENT DOCUMENTS

| | | |
|---|---|---|
| 2012/0146884 A1 | 6/2012 | Wang et al. |
| 2012/0191802 A1* | 7/2012 | Rodrigues .............. H04L 67/06 709/217 |
| 2012/0236104 A1* | 9/2012 | Fang .................... G01S 5/0072 348/14.02 |
| 2013/0185440 A1* | 7/2013 | Blau .................. H04L 61/2589 709/227 |
| 2013/0244730 A1* | 9/2013 | Yoo ......................... H04M 1/23 455/566 |
| 2013/0308628 A1* | 11/2013 | Marueli ............. H04L 65/1076 370/352 |
| 2014/0086105 A1 | 3/2014 | Kang et al. |
| 2014/0197232 A1* | 7/2014 | Birkler ................ G06F 21/313 235/375 |
| 2014/0355614 A1* | 12/2014 | Liu ..................... H04L 61/2589 370/392 |
| 2017/0201796 A1* | 7/2017 | Vinson ............. H04N 21/44222 |

FOREIGN PATENT DOCUMENTS

| | | | |
|---|---|---|---|
| CN | 103336677 | A | 10/2013 |
| CN | 103366659 | A | 10/2013 |
| CN | 103874228 | A | 6/2014 |
| GB | 2367727 | A | 4/2002 |
| KR | 20110051351 | A | 5/2011 |
| KR | 20140039430 | A | 4/2014 |
| WO | 2009135312 | A1 | 11/2009 |

\* cited by examiner

TERMINAL, SERVER, AND TERMINAL CONTROL METHOD

CROSS REFERENCE TO RELATED APPLICATIONS

The present application claims priority under 35 U.S.C. § 365 to International Patent Application No. PCT/CN2014/083643 filed Aug. 4, 2014 which is incorporated herein by reference into the present disclosure as if fully set forth herein.

TECHNICAL FIELD

The present invention relates to the field of mobile terminals, and in particular, to a terminal, a server, and a terminal control method.

BACKGROUND

Thanks to rapid development of electronics and communications technologies, communications and processing capabilities of mobile terminals also become stronger, and applications based on remote control between mobile terminals also develop rapidly.

In remote control between existing mobile terminals, a connection is first established between a control terminal and a controlled terminal, the controlled terminal sends screen data to the control terminal by using the connection, the control terminal displays a screenshot of the controlled terminal on a screen of the control terminal according to the screen data, a user performs, on the screen of the control terminal, an operation such as a touch on the screenshot of the controlled terminal, the control terminal sends received operation information to the controlled terminal by using the connection, and the controlled terminal performs a corresponding operation according to the operation information, so as to achieve an objective of remote control.

In a process of implementing the present invention, the inventor finds that the prior art has at least the following problems:

Screen data and operation information are exchanged between a control terminal and a controlled terminal by using a same connection, and conflicts exist between screen data and the operation information in transmission logic and transmission time. Therefore, a screenshot, of the controlled terminal, displayed on a control terminal side cannot make a response to a user operation on the control terminal side in time, affecting a control effect and user experience.

SUMMARY

To resolve a problem in the prior art that a screenshot, of a controlled terminal, displayed on a control terminal side cannot make a response to a user operation on the control terminal side in time because conflicts exist between screen data and operation information in transmission logic and transmission time, embodiments of the present invention provide a terminal, a server, and a terminal control method. The technical solutions are as follows:

According to a first aspect, a control terminal is provided, where the control terminal includes:

a first channel establishment module, configured to establish a control channel and a data channel to a controlled terminal;

an image data receiving module, configured to receive screen image data that is sent by the controlled terminal by using the data channel, where the screen image data is used to indicate a screenshot of the controlled terminal;

a display module, configured to display the screenshot of the controlled terminal according to the screen image data;

an operation information generation module, configured to generate corresponding operation information according to an operation that is based on the screenshot; and an operation information sending module, configured to send the operation information to the controlled terminal by using the control channel, so that the controlled terminal performs a corresponding control operation according to the operation information.

In a first possible implementation manner of the first aspect, the first channel establishment module includes:

a first channel establishment submodule, configured to establish the control channel to the controlled terminal by using the server; and a second channel establishment submodule, configured to establish the data channel to the controlled terminal by using the server and the control channel.

With reference to the first possible implementation manner of the first aspect, in a second possible implementation manner of the first aspect, the second channel establishment submodule includes:

a first address acquiring unit, configured to acquire address information of the control terminal from the server, where the address information includes a local address, a mapping address of network address translation, and a relay address of traversal using relays around network address translation;

a second address acquiring unit, configured to acquire address information of the controlled terminal from the server or the controlled terminal;

a first path determining unit, configured to determine a connection path according to the address information of the control terminal and the address information of the controlled terminal; and a first establishment unit, configured to establish the data channel according to the connection path.

With reference to the first aspect, the first possible implementation manner of the first aspect, or the second possible implementation manner of the first aspect, in a third possible implementation manner of the first aspect, the operation information includes at least one of touch information, button information, and voice information, and the operation information generation module includes:

a monitoring submodule, configured to: when the operation information is touch information, monitor a touch event corresponding to the operation;

a first generation submodule, configured to generate the operation information according to the touch event;

a first button type determining submodule, configured to: when the operation information is button information, determine a button type corresponding to the operation;

a second generation submodule, configured to generate the operation information including an identifier corresponding to the button type;

a voice recognition submodule, configured to: when the operation information is voice information, recognize a text from a voice corresponding to the operation; and a second generation submodule, configured to retrieve a control instruction included in the text, and generate the operation information including an identifier corresponding to the control instruction.

With reference to the third possible implementation manner of the first aspect, in a fourth possible implementation manner of the first aspect, the first generation submodule includes: a first generation unit or a second generation unit, where the first generation unit is configured to serialize the touch event into a byte stream, and generate the operation information including the byte stream; and the second generation unit is configured to retrieve key information of the touch event, encode the key information into a specified-format file, and generate the operation information including the specified-format file, where the key information includes an event type, touch coordinates, and/or touch force.

With reference to the third possible implementation manner of the first aspect, in a fourth possible implementation manner of the first aspect, the first path determining unit includes:

a combining subunit, configured to combine the address information of the control terminal and the address information of the controlled terminal into an address pair;

a test subunit, configured to perform a connectivity test on the address pair; and an establishment subunit, configured to determine the connection path according to a result of the connectivity test.

According to a second aspect, a control terminal is provided, where the control terminal includes: a bus, and a processor, a memory, a transmitter, and a receiver that are connected to the bus, where the memory is configured to store several instructions, where the several instructions are configured to be executed by the processor;

the processor is configured to control the receiver and the transmitter to establish a control channel and a data channel to a controlled terminal;

the receiver is configured to receive screen image data that is sent by the controlled terminal by using the data channel, where the screen image data is used to indicate a screenshot of the controlled terminal;

the processor is configured to display the screenshot of the controlled terminal on a display device according to the screen image data, and generate corresponding operation information according to an operation that is based on the screenshot; and the processor is configured to control the transmitter to send the operation information to the controlled terminal by using the control channel, so that the controlled terminal perform is a corresponding control operation according to the operation information.

In a first possible implementation manner of the second aspect, the processor is configured to control the receiver and the transmitter to establish the control channel to the controlled terminal by using the server; and the processor is configured to control the receiver and the transmitter to establish the data channel to the controlled terminal by using the server and the control channel.

With reference to the first possible implementation manner of the second aspect, in a second possible implementation manner of the second aspect, the processor is configured to control the receiver and the transmitter to acquire address information of the control terminal from the server, where the address information includes a local address, a mapping address of network address translation, and a relay address of traversal using relays around network address translation;

the processor is configured to control the receiver and the transmitter to acquire address information of the controlled terminal from the server or the controlled terminal;

the processor is configured to determine a connection path according to the address information of the control terminal and the address information of the controlled terminal; and the processor is configured to control the receiver and the transmitter to establish the data channel according to the connection path.

With reference to the second aspect, the first possible implementation manner of the second aspect, or the second possible implementation manner of the second aspect, in a third possible implementation manner of the second aspect, the operation information includes at least one of touch information, button information, and voice information;

the processor is configured to: when the operation information is touch information, monitor a touch event corresponding to the operation, and generate the operation information according to the touch event;

the processor is configured to: when the operation information is button information, determine a button type corresponding to the operation, and generate the operation information including an identifier corresponding to the button type; and the processor is configured to: when the operation information is voice information, recognize a text from a voice corresponding to the operation, retrieve a control instruction included in the text, and generate the operation information including an identifier corresponding to the control instruction.

With reference to the third possible implementation manner of the second aspect, in a fourth possible implementation manner of the second aspect, the processor is configured to serialize the touch event into a byte stream, and generate the operation information including the byte stream;

or the processor is configured to retrieve key information of the touch event, encode the key information into a specified-format file, and generate the operation information including the specified-format file, where the key information includes an event type, touch coordinates, and/or touch force.

With reference to the second possible implementation manner of the second aspect, in a fifth possible implementation manner of the second aspect, the processor is configured to combine the address information of the control terminal and the address information of the controlled terminal into an address pair, perform a connectivity test on the address pair, and determine the connection path according to a result of the connectivity test.

According to a third aspect, a controlled terminal is provided, where the controlled terminal includes:

a second channel establishment module, configured to establish a control channel and a data channel to a control terminal;

an image data acquiring module, configured to acquire screen image data used to indicate a screenshot of the controlled terminal;

an image data sending module, configured to send the screen image data to the control terminal by using the data channel, so that the control terminal displays the screenshot of the controlled terminal according to the screen data image;

an operation information receiving module, configured to receive operation information that is sent by the control terminal by using the control channel, where the operation information is information generated by the control terminal according to an operation that is based on the screenshot; and a performing module, configured to perform a corresponding control operation according to the operation information.

In a first possible implementation manner of the third aspect, the second channel establishment module includes:

a third channel establishment submodule, configured to establish the control channel to the control terminal by using the server; and a fourth channel establishment submodule, configured to establish the data channel to the control terminal by using the server and the control channel.

With reference to the first possible implementation manner of the third aspect, in a second possible implementation manner of the third aspect, the fourth channel establishment submodule includes:

a third address acquiring unit, configured to acquire address information of the controlled terminal from the server, where the address information includes a local address, a mapping address of network address translation, and a relay address of traversal using relays around network address translation;

a fourth address acquiring unit, configured to acquire address information of the control terminal from the server or the control terminal;

a second path determining unit, configured to determine a connection path according to the address information of the control terminal and the address information of the controlled terminal; and a second establishment unit, configured to establish the data channel according to the connection path.

With reference to the third aspect, the first possible implementation manner of the third aspect, or the second possible implementation manner of the third aspect, in a third possible implementation manner of the third aspect, the operation information includes at least one of touch information, button information, and voice information, and the performing module includes:

an event restoration submodule, configured to: when the operation information is touch information, restore, according to the control information, a touch event corresponding to a touch operation;

a first performing submodule, configured to perform the control operation according to the touch event;

a second button type determining submodule, configured to: when the operation information is button information, determine, according to an identifier included in the operation information, a button type corresponding to a button operation;

a second performing submodule, configured to perform the control operation according to the button type;

an instruction determining submodule, configured to: when the operation information is voice information, determine, according to an identifier included in the operation information, a control instruction corresponding to a voice operation; and a third performing submodule, configured to perform the control operation according to the control instruction.

With reference to the third possible implementation manner of the third aspect, in a fourth possible implementation manner of the third aspect, the event restoration submodule includes: a first restoration unit or a second restoration unit, where the first restoration unit is configured to deserialize a byte stream included in the operation information, to restore the touch event; and the first restoration unit is configured to retrieve key information of the touch event from a specified-format file included in the operation information, and restore the touch event according to the key information, where the key information includes an event type, touch coordinates, and/or touch force.

According to a fourth aspect, a controlled terminal is provided, where the controlled terminal includes: a bus, and a processor, a memory, a transmitter, and a receiver that are connected to the bus, where the memory is configured to store several instructions, where the several instructions are configured to be executed by the processor;

the processor is configured to control the receiver and the transmitter to establish a control channel and a data channel to a control terminal;

the processor is configured to acquire screen image data used to indicate a screenshot of the controlled terminal;

the processor is configured to control the transmitter to send the screen image data to the control terminal by using the data channel, so that the control terminal displays the screenshot of the controlled terminal according to the screen data image;

the receiver is configured to receive operation information that is sent by the control terminal by using the control channel, where the operation information is information generated by the control terminal according to an operation that is based on the screenshot; and the processor is configured to perform a corresponding control operation according to the operation information.

In a first possible implementation manner of the fourth aspect, the processor is configured to control the receiver and the transmitter to establish the control channel to the control terminal by using the server; and the processor is configured to control the receiver and the transmitter to establish the data channel to the control terminal by using the server and the control channel.

With reference to the first possible implementation manner of the fourth aspect, in a second possible implementation manner of the fourth aspect, the processor is configured to control the receiver and the transmitter to acquire address information of the controlled terminal from the server, where the address information includes a local address, a mapping address of network address translation, and a relay address of traversal using relays around network address translation;

the processor is configured to control the receiver and the transmitter to acquire address information of the control terminal from the server or the control terminal;

the processor is configured to determine a connection path according to the address information of the control terminal and the address information of the controlled terminal; and the processor is configured to control the receiver and the transmitter to establish the data channel according to the connection path.

With reference to the fourth aspect, the first possible implementation manner of the fourth aspect, or the second possible implementation manner of the fourth aspect, in a third possible implementation manner of the fourth aspect, the operation information includes at least one of touch information, button information, and voice information;

the processor is configured to: when the operation information is touch information, restore, according to the control information, a touch event corresponding to a touch operation, and perform the control operation according to the touch event;

the processor is configured to: when the operation information is button information, determine, according to an identifier included in the operation information, a button type corresponding to a button operation, and perform the control operation according to the button type; and the processor is configured to: when the operation information is voice information, determine, according to an identifier included in the operation information, a control instruction corresponding to a voice operation, and perform the control operation according to the control instruction.

With reference to the third possible implementation manner of the fourth aspect, in a fourth possible implementation manner of the fourth aspect, the processor is configured to deserialize a byte stream included in the operation information, to restore the touch event;

or the processor is configured to retrieve key information of the touch event from a specified-format file included in the operation information, and restore the touch event according to the key information, where the key information includes an event type, touch coordinates, and/or touch force.

According to a fifth aspect, a server is provided, where the server includes:

a control channel establishment module, configured to establish a control channel between a control terminal and a controlled terminal;

a first address providing module, configured to provide address information of the control terminal to the control terminal, and provide address information of the controlled terminal to the controlled terminal, so that after the control terminal and the controlled terminal exchange the address information by using the control channel, the control terminal or the controlled terminal determines a connection path according to the address information of the control terminal and the address information of the controlled terminal, and establishes the data channel according to the connection path, and the control terminal performs control on the controlled terminal by using the control channel and the data channel;

a second address providing module, provide address information of the control terminal and address information of the controlled terminal to the control terminal, so that the control terminal determines a connection path according to the address information of the control terminal and the address information of the controlled terminal, and establishes the data channel according to the connection path, and the control terminal performs control on the controlled terminal by using the control channel and the data channel; and a third address providing module, provide address information of the control terminal and address information of the controlled terminal to the controlled terminal, so that the controlled terminal determines a connection path according to the address information of the control terminal and the address information of the controlled terminal, and establishes the data channel according to the connection path, and the control terminal performs control on the controlled terminal by using the control channel and the data channel.

In a first possible implementation manner of the fifth aspect, the control channel establishment module includes:

a request receiving submodule, configured to: after the control terminal is connected to the server, receive a control channel establishment request sent by the control terminal;

a judging submodule, configured to determine whether the controlled terminal is already connected to the server; and a channel establishment submodule, configured to: if a determining result of the judging submodule is that the controlled terminal is already connected to the server, establish the control channel between the control terminal and the controlled terminal.

With reference to the first possible implementation manner of the fifth aspect, in a second possible implementation manner of the fifth aspect, the control channel establishment module further includes:

a notification submodule, configured to: if the determining result of the judging submodule is that the controlled terminal is not connected to the server, send a connection notification to the controlled terminal, where the connection notification is used to instruct to connect the controlled terminal to the server.

According to a sixth aspect, a server is provided, where the server includes: a bus, and a processor, a memory, a transmitter, and a receiver that are connected to the bus, where the memory is configured to store several instructions, where the several instructions are configured to be executed by the processor;

the processor is configured to control the receiver and the transmitter to establish a control channel between a control terminal and a controlled terminal;

the processor is configured to control the receiver and the transmitter to provide address information of the control terminal to the control terminal, and provide address information of the controlled terminal to the controlled terminal, so that after the control terminal and the controlled terminal exchange the address information by using the control channel, the control terminal or the controlled terminal determines a connection path according to the address information of the control terminal and the address information of the controlled terminal, and establishes the data channel according to the connection path, and the control terminal performs control on the controlled terminal by using the control channel and the data channel; or the processor is configured to provide address information of the control terminal and address information of the controlled terminal to the control terminal, so that the control terminal determines a connection path according to the address information of the control terminal and the address information of the controlled terminal, and establishes the data channel according to the connection path, and the control terminal performs control on the controlled terminal by using the control channel and the data channel; or the processor is configured to provide address information of the control terminal and address information of the controlled terminal to the controlled terminal, so that the controlled terminal determines a connection path according to the address information of the control terminal and the address information of the controlled terminal, and establishes the data channel according to the connection path, and the control terminal performs control on the controlled terminal by using the control channel and the data channel.

In a first possible implementation manner of the sixth aspect, the receiver is configured to: after the control terminal is connected to the server, receive a control channel establishment request sent by the control terminal; and the processor is configured to determine whether the controlled terminal is already connected to the server; and if a determining result is that the controlled terminal is already connected to the server, control the receiver and the transmitter to establish the control channel between the control terminal and the controlled terminal.

With reference to the first possible implementation manner of the sixth aspect, in a second possible implementation manner of the sixth aspect, the processor is configured to: if the determining result is that the controlled terminal is not connected to the server, control the transmitter to send a connection notification to the controlled terminal, where the connection notification is used to instruct to connect the controlled terminal to the server.

According to a seventh aspect, a terminal control method is provided, and is used in a control terminal, where the method includes:

establishing a control channel and a data channel to a controlled terminal;

receiving screen image data that is sent by the controlled terminal by using the data channel, where the screen image data is used to indicate a screenshot of the controlled terminal;

displaying the screenshot of the controlled terminal according to the screen image data;

generating corresponding operation information according to an operation that is based on the screenshot; and sending the operation information to the controlled terminal by using the control channel, so that the controlled terminal performs a corresponding control operation according to the operation information.

In a first possible implementation manner of the seventh aspect, the establishing a control channel and a data channel to a controlled terminal includes:

establishing the control channel to the controlled terminal by using the server; and establishing the data channel to the controlled terminal by using the server and the control channel.

With reference to the first possible implementation manner of the seventh aspect, in a second possible implementation manner of the seventh aspect, the establishing the data channel to the controlled terminal by using the server and the control channel includes:

acquiring address information of the control terminal from the server, where the address information includes a local address, a mapping address of network address translation, and a relay address of traversal using relays around network address translation;

acquiring address information of the controlled terminal from the server or the controlled terminal;

determining a connection path according to the address information of the control terminal and the address information of the controlled terminal; and establishing the data channel according to the connection path.

With reference to the seventh aspect, the first possible implementation manner of the seventh aspect, or the second possible implementation manner of the seventh aspect, in a third possible implementation manner of the seventh aspect, the operation information includes at least one of touch information, button information, and voice information, and the generating operation information according to an operation that is based on the screenshot includes:

when the operation information is touch information, monitoring to a touch event corresponding to the operation, and generating the operation information according to the touch event;

when the operation information is button information, determining a button type corresponding to the operation, and generating the operation information including an identifier corresponding to the button type; and when the operation information is voice information, recognizing a text from a voice corresponding to the operation, retrieving a control instruction included in the text, and generating the operation information including an identifier corresponding to the control instruction.

With reference to the third possible implementation manner of the seventh aspect, in a fourth possible implementation manner of the seventh aspect, the generating the operation information according to the touch event includes:

serializing the touch event into a byte stream, and generating the operation information including the byte stream;

or retrieving key information of the touch event, encoding the key information into a specified-format file, and generating the operation information including the specified-format file, where the key information includes an event type, touch coordinates, and/or touch force.

With reference to the third possible implementation manner of the seventh aspect, in a fourth possible implementation manner of the seventh aspect, the determining a connection path according to the address information of the control terminal and the address information of the controlled terminal includes:

combining the address information of the control terminal and the address information of the controlled terminal into an address pair, performing a connectivity test on the address pair, and determining the connection path according to a result of the connectivity test.

According to an eighth aspect, a terminal control method is provided, and is used in a controlled terminal, where the method includes:

establishing a control channel and a data channel to a control terminal;

acquiring screen image data used to indicate a screenshot of the controlled terminal;

sending the screen image data to the control terminal by using the data channel, so that the control terminal displays the screenshot of the controlled terminal according to the screen data image;

receiving operation information that is sent by the control terminal by using the control channel, where the operation information is information generated by the control terminal according to an operation that is based on the screenshot; and performing a corresponding control operation according to the operation information.

In a first possible implementation manner of the eighth aspect, the establishing a control channel and a data channel to a control terminal includes:

establishing the control channel to the control terminal by using the server; and establishing the data channel to the control terminal by using the server and the control channel.

With reference to the first possible implementation manner of the eighth aspect, in a second possible implementation manner of the eighth aspect, the establishing the data channel to the control terminal according to the server and the control channel includes:

acquiring address information of the controlled terminal from the server, where the address information includes a local address, a mapping address of network address translation, and a relay address of traversal using relays around network address translation;

acquiring address information of the control terminal from the server or the control terminal;

determining a connection path according to the address information of the control terminal and the address information of the controlled terminal; and establishing the data channel according to the connection path.

With reference to the eighth aspect, the first possible implementation manner of the eighth aspect, or the second possible implementation manner of the eighth aspect, in a third possible implementation manner of the eighth aspect, the operation information includes at least one of touch information, button information, and voice information, and the performing a corresponding control operation according to the operation information includes:

when the operation information is touch information, restoring, according to the operation information, a touch event corresponding to the operation, and performing the control operation according to the touch event;

when the operation information is button information, determining, according to an identifier included in the operation information, a button type corresponding to the operation, and performing the control operation according to the button type; and when the operation information is voice information, determining, according to an identifier included in the operation information, a control instruction corresponding to the operation, and performing the control operation according to the control instruction.

With reference to the third possible implementation manner of the eighth aspect, in a fourth possible implementation manner of the eighth aspect, the restoring, according to the control information, a touch event corresponding to a touch operation includes:

deserialing a byte stream included in the operation information, to restore the touch event;

or retrieving key information of the touch event from a specified-format file included in the operation information, and restoring the touch event according to the key information, where the key information includes an event type, touch coordinates, and/or touch force.

According to a ninth aspect, a terminal control method is provided, and is used in a server, where the method includes:

establishing a control channel between a control terminal and a controlled terminal; and providing address information of the control terminal to the control terminal, and providing address information of the controlled terminal to the controlled terminal, so that after the control terminal and the controlled terminal exchange the address information by using the control channel, the control terminal or the controlled terminal determines a connection path according to the address information of the control terminal and the address information of the controlled terminal, and establishes the data channel according to the connection path, and the control terminal performs control on the controlled terminal by using the control channel and the data channel; or providing address information of the control terminal and address information of the controlled terminal to the control terminal, so that the control terminal determines a connection path according to the address information of the control terminal and the address information of the controlled terminal, and establishes the data channel according to the connection path, and the control terminal performs control on the controlled terminal by using the control channel and the data channel; or providing address information of the control terminal and address information of the controlled terminal to the controlled terminal, so that the controlled terminal determines a connection path according to the address information of the control terminal and the address information of the controlled terminal, and establishes the data channel according to the connection path, and the control terminal performs control on the controlled terminal by using the control channel and the data channel.

In a first possible implementation manner of the ninth aspect, the establishing a control channel between a control terminal and a controlled terminal includes:

after the control terminal is connected to the server, receiving a control channel establishment request sent by the control terminal;

determining whether the controlled terminal is already connected to the server; and if a determining result is that the controlled terminal is already connected to the server, establishing the control channel between the control terminal and the controlled terminal.

With reference to the first possible implementation manner of the ninth aspect, in a second possible implementation manner of the ninth aspect, the method further includes:

if the determining result is that the controlled terminal is not connected to the server, sending a connection notification to the controlled terminal, where the connection notification is used to instruct to connect the controlled terminal to the server.

The technical solutions provided in the embodiments of the present invention bring beneficial effects:

A control channel and a data channel are established to a controlled terminal, screen image data that is sent by the controlled terminal by using the data channel is received, a screenshot of the controlled terminal is displayed according to the screen image data, corresponding operation information is generated according to an operation that is based on the screenshot, and the operation information is sent to the controlled terminal by using the control channel, so that the controlled terminal performs a corresponding control operation according to the operation information. In this way, two independent channels are used to transmit control information and screen image data between two terminals, which avoids a problem that the screenshot, of the controlled terminal, displayed on a control terminal side cannot make a response to a user operation on the control terminal side in time because conflicts exist between screen data and the operation information in transmission logic and transmission time, thereby achieving objectives of improving a control effect and user experience.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

To make the objectives, technical solutions, and advantages of the present invention clearer, the following further describes the embodiments of the present invention in detail with reference to the accompanying drawings.

Figure 1:
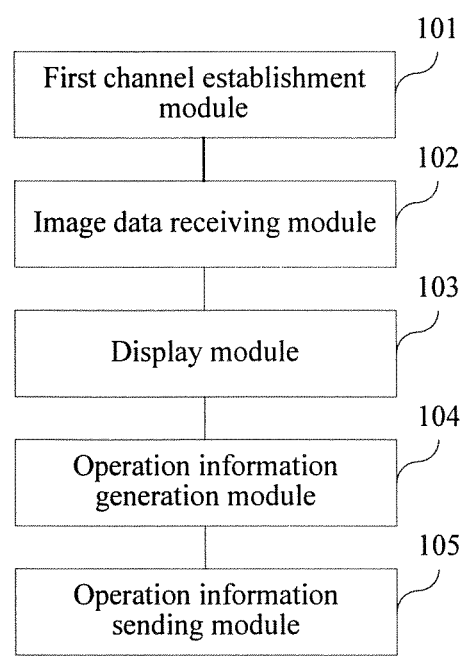
FIG. 1 is a schematic structural diagram of a control terminal according to an embodiment of the present invention.

Refer to FIG. 1, which is a schematic structural diagram of a control terminal according to an embodiment of the present invention. The control terminal is configured to perform remote control on a controlled terminal, where the control terminal and the controlled terminal may be mobile terminals each having a display unit and having a same operation mode, such as smartphones, tablet computers, and e-book readers. The control terminal may include:

a first channel establishment module 101, configured to establish a control channel and a data channel to the controlled terminal;

an image data receiving module 102, configured to receive screen image data that is sent by the controlled terminal at a specified frame rate by using the data channel, where the screen image data is used to indicate a screenshot of the controlled terminal;

a display module 103, configured to display the screenshot of the controlled terminal according to the screen image data;

an operation information generation module 104, configured to generate corresponding operation information according to an operation that is based on the screenshot; and an operation information sending module 105, configured to send the operation information to the controlled terminal by using the control channel, so that the controlled terminal performs a corresponding control operation according to the operation information.

In conclusion, the control terminal provided in this embodiment of the present invention establishes a control channel and a data channel to a controlled terminal, receives screen image data that is sent by the controlled terminal by using the data channel, displays a screenshot of the controlled terminal according to the screen image data, generates corresponding operation information according to an operation that is based on the screenshot, and sends the operation information to the controlled terminal by using the control channel, so that the controlled terminal performs a corresponding control operation according to the operation information. In this way, two independent channels are used to transmit control information and screen image data between two terminals, which avoids a problem that the screenshot, of the controlled terminal, displayed on a control terminal side cannot make a response to a user operation on the control terminal side in time because conflicts exist between screen data and the operation information in transmission logic and transmission time, thereby achieving objectives of improving a control effect and user experience.

Figure 2:
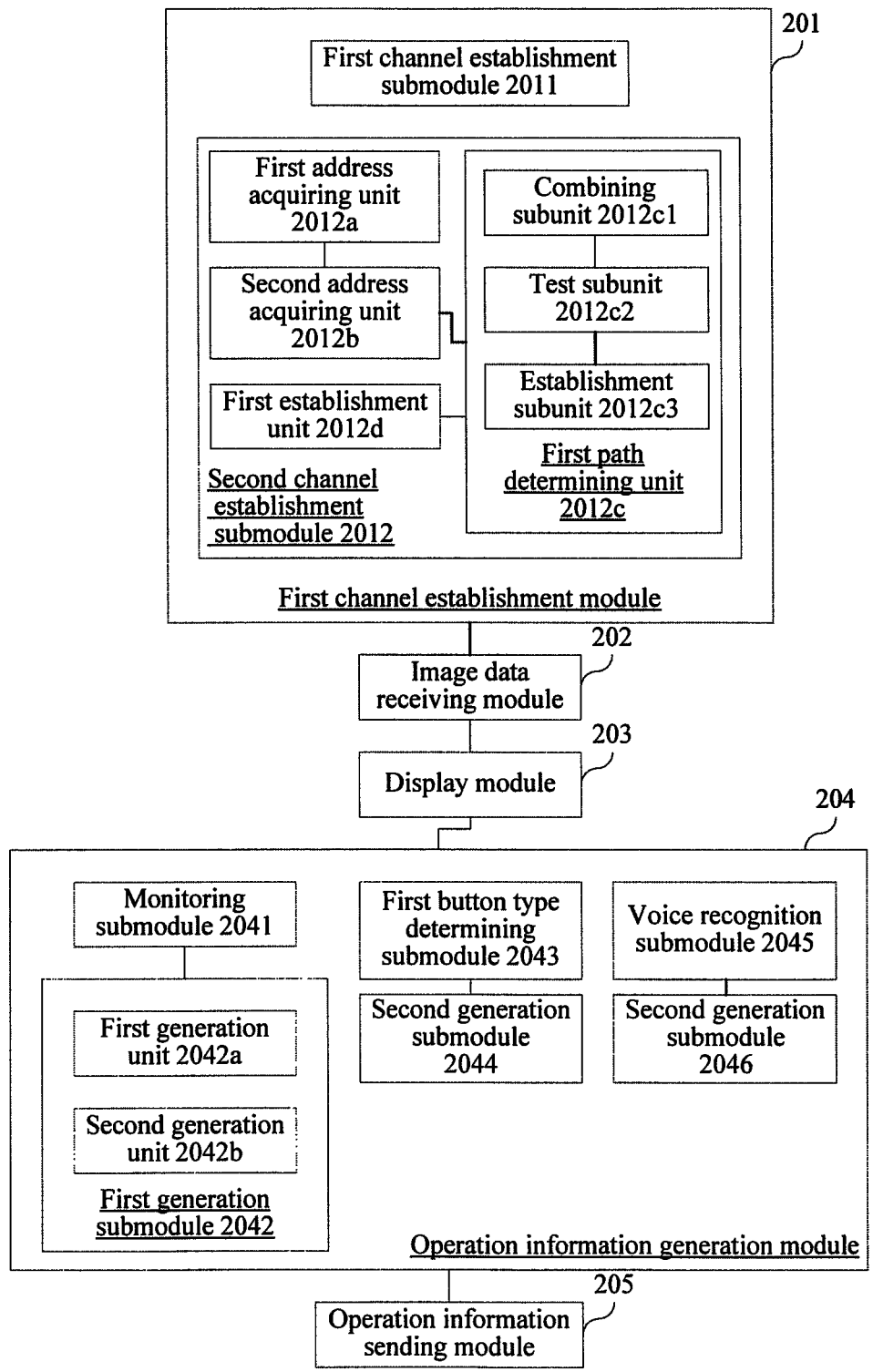
FIG. 2 is a schematic structural diagram of a control terminal according to another embodiment of the present invention.

Refer to FIG. 2, which is a schematic structural diagram of a control terminal according to another embodiment of the present invention. The control terminal is configured to perform remote control on a controlled terminal, where the control terminal and the controlled terminal may be mobile terminals each having a display unit and having a same operation mode, such as smartphones, tablet computers, and e-book readers. The control terminal may include:

A first channel establishment module 201 is configured to establish a control channel and a data channel to the controlled terminal.

The first channel establishment module 201 includes:

A first channel establishment submodule 2011 is configured to establish the control channel to the controlled terminal by using the server.

The server may be divided, according to a function, into three parts: a connection server, a control channel server, and a data channel server. The control terminal and the controlled terminal are connected to a connection server at an initial moment, and stay online by using a manner of a heartbeat connection.

In an actual application, the connection server, the control channel server, and the data channel server may be integrated into a same server entity.

When a user wants to perform control on the controlled terminal in the control terminal, the user may establish the control channel to the controlled terminal by using the control channel server, where a specific procedure of establishing the control channel may include the following steps:

1) Connect the control terminal to the control channel server.

An example in which the control terminal is a smartphone A and the controlled terminal is a smartphone B is used. After the user enables a remote control function on the smartphone A, the smartphone A can establish a connection to the control channel server.

2) The control terminal sends a control channel establishment request to the control channel server.

The control channel establishment request is used to instruct the control channel server to establish the control channel between the control terminal and the controlled terminal.

After the user chooses, in the smartphone A, the smartphone B as a control object, the smartphone A sends the control channel establishment request to the control channel server, where the control channel establishment request includes an identifier of the smartphone B, so that the control channel server determines the control object requested by the smartphone A.

3) If the controlled terminal is already connected to the control channel server, the control channel server establishes the control channel.

The control channel server first determines whether the smartphone B is already connected to the control channel server. If the smartphone B already establishes a connection to the control channel server, the control channel between the smartphone A and the smartphone B is directly established.

4) If the controlled terminal is not connected to the control channel server, the control channel server sends a connection notification to the controlled terminal.

If determining that the smartphone B is not connected, the control channel server sends a connection notification to the smartphone B, to instruct to connect the smartphone B to the control channel server.

5) Connect the controlled terminal to the control channel server according to the connection notification.

After receiving the connection notification, the smartphone B initiates a connection procedure, to connect the smartphone B to the control channel server.

6) The control channel server establishes the control channel.

After confirming that the smartphone B is successfully connected according to the connection notification, the control channel server establishes the control channel.

It should be noted that in the control channel established according to the foregoing steps, the control channel server is used as a relay to perform forwarding of information. Because control signaling sent by using the control channel has a relatively small amount of data and requirements for reliability and accuracy of data transmission are relatively high, the control channel is established based on the reliable TCP protocol.

A second channel establishment submodule 2012 is configured to establish the data channel to the controlled terminal by using the server and the control channel.

The second channel establishment submodule 2012 includes:

A first address acquiring unit 2012a is configured to acquire address information of the control terminal from the server, where the address information includes a local address, a mapping address of network address translation, and a relay address of traversal using relays around network address translation.

A second address acquiring unit 2012b is configured to acquire address information of the controlled terminal from the server or the controlled terminal.

The control terminal may acquire the address information of the controlled terminal from the server, or may acquire the address information of the controlled terminal from the controlled terminal by using the control channel. The control terminal may send a request for collecting the address information of the controlled terminal to the server, and receive an address, of the controlled terminal, fed back by the server; or the control terminal may request the address information of the controlled terminal from the controlled terminal by using the already established control channel.

A first path determining unit 2012c is configured to determine a connection path according to the address information of the control terminal and the address information of the controlled terminal.

A first establishment unit 2012d is configured to establish the data channel according to the connection path.

The first path determining unit 2012c includes:

a combining subunit 2012c1, configured to combine the address information of the control terminal and the address information of the controlled terminal into an address pair;

a test subunit 2012c2, configured to perform a connectivity test on the address pair; and an establishment subunit 2012c3, configured to determine the connection path according to a result of the connectivity test.

In an example, the control terminal and the controlled terminal acquire and exchange the address information by using the server and the control channel, and establish the data channel according to the address information of the control terminal and the controlled terminal, establishment of the data channel may be initiated by the control terminal or the controlled terminal, and the control terminal proactively initiates establishment of the data channel, where a specific procedure of establishment may be as follows:

1) The control terminal initiates a data channel establishment instruction to the controlled terminal by using the control channel.

The smartphone A sends the data channel establishment instruction to the smartphone B by using the control channel in which the control channel server is used as a relay.

2) The control terminal acquires the address information of the control terminal from the data channel server.

The smartphone A sends an address collection request to the data channel server, and the data channel server returns address information of the smartphone A to the smartphone A according to the address collection request. The address information may include three types: a local address of a smartphone, a public mapping address of NAT (Network Address Translation, network address translation), and a relay address of TURN (Traversal Using Relays around NAT, traversal using relays around NAT).

3) The controlled terminal acquires the address information of the controlled terminal from the data channel server.

Similarly, after receiving the data channel establishment instruction, the smartphone B also sends an address collection request to the data channel server, and the data channel server returns address information of the smartphone B to the smartphone B according to the address collection request.

4) The control terminal acquires the address information of the controlled terminal from the controlled terminal by using the control channel.

The smartphone A receives the address information, sent by the smartphone B by using the control channel, of the smartphone B.

5) The control terminal determines a connection path according to the address information of the control terminal and the address information of the controlled terminal.

The smartphone A combines three types of addresses of the smartphone A and three types of addresses of the smartphone B into address pairs, performs a connectivity test on the address pairs obtained by using combination, and determines an optimal path as a connection path according to a result of the connectivity test.

6) The control terminal establishes the data channel by using the determined connection path.

The control terminal may directly acquire the address information of the controlled terminal from the server. For example, the control terminal may send a request for collecting the address information of the controlled terminal to the server, the server sends the address information of the controlled terminal to the control terminal, and the control terminal determines the connection path and establishes the data channel according to the address information of the control terminal and the address information of the controlled terminal.

Alternatively, the foregoing process of establishing the data channel may be initiated by the controlled terminal, and a procedure of establishing the data channel is similar to the foregoing process.

It should be noted that the data channel may be established by using a relay manner, or may be established in a direct connection manner. For example, when the control terminal and the controlled terminal may be directly connected by using a wireless local area network, Bluetooth, or the like, or the data channel may be established in a direct connection manner. When a connection between the control terminal and the controlled terminal can be established by using only the Internet, the data channel in which the server is used as a relay may be established.

In addition, because image information has a relatively large amount of data, has relatively low requirements for reliability and accuracy, and may allow packet loss to a certain degree, the data channel may be established based on the UDP (User Data Protocol, User Datagram Protocol).

In all the foregoing processes of establishing the control channel and the data channel, the server is required for relaying. In an actual application, the control channel and/or the data channel may be directly established without using the server.

For example, when the control terminal and the controlled terminal are in a same wireless local area network or are within a range of a Bluetooth connection, the control channel and the data channel may be directly established by using a wireless local area network or Bluetooth without the need of performing relaying and forwarding by using the server.

Alternatively, when the control terminal and the controlled terminal are in a same wireless local area network or are within a range of a Bluetooth connection, the control channel may be directly established by using a wireless local area network or Bluetooth, and the data channel is established by using the server.

Alternatively, when the control terminal and the controlled terminal are in a same wireless local area network or are within a range of a Bluetooth connection, the control channel may be established by using the server, and the data channel may be directly established by using a wireless local area network or Bluetooth.

An image data receiving module 202 is configured to receive screen image data that is sent by the controlled terminal by using the data channel.

When a screen of the controlled terminal is turned on, the screen image data may be captured at a specified frame rate, where the specified frame rate may be a fixed frame rate. For example, the controlled terminal may set the specified frame rate to fixed 30 FPS (Frames Per Second, a quantity of frames transmitted per second), that is, image data of 30 frames of screen images is captured per second; or the controlled terminal may dynamically set a specified frame rate according to content displayed in the screen. For example, when the content displayed in the screen is a static page, the specified frame rate may be set to a relatively small numerical value (for example, 10). When the content displayed in the screen is a dynamic video, the specified frame rate may be set to a relatively large numerical value (for example, 60).

After the data channel is established, the controlled terminal may transmit media data such as an image and/or audio. After performing encoding (for example, performing encoding in an H.264 manner) on the screen image data captured at the specified frame rate, the controlled terminal transmits the screen image data to the control terminal by using the data channel.

A display module 203 is configured to display a screenshot of the controlled terminal according to the screen image data.

After receiving screen image data that is sent by the smartphone B by using the data channel, the smartphone A displays a screenshot of the smartphone B on a screen at a suitable resolution.

An operation information generation module 204 is configured to generate corresponding operation information according to an operation that is based on the screenshot.

The operation information includes at least one of touch information, button information, and voice information, and the operation information generation module 204 includes:

a monitoring submodule 2041, configured to: when the operation information is touch information, monitor a touch event corresponding to the operation;

a first generation submodule 2042, configured to generate the operation information according to the touch event;

a first button type determining submodule 2043, configured to: when the operation information is button information, determine a button type corresponding to the operation;

a second generation submodule 2044, configured to generate the operation information including an identifier corresponding to the button type;

a voice recognition submodule 2045, configured to: when the operation information is voice information, recognize a text from a voice corresponding to the operation; and a second generation submodule 2046, configured to retrieve a control instruction included in the text, and generate the operation information including an identifier corresponding to the control instruction.

The first generation submodule 2042 includes: a first generation unit 2042a or a second generation unit 2042b, where the first generation unit 2042a is configured to serialize the touch event into a byte stream, and generate the operation information including the byte stream; and the second generation unit 2042b is configured to retrieve key information of the touch event, encode the key information into a specified-format file, and generate the operation information including the specified-format file, where the key information includes an event type, touch coordinates, and/or touch force.

An operation information sending module 205 is configured to send the operation information to the controlled terminal by using the control channel, so that the controlled terminal performs a corresponding control operation according to the operation information.

A smartphone is used as an example. An operation of a user in the smartphone A may include a touch operation, a button operation, and a voice operation, and correspondingly generated operation information is separately touch information, button information, and voice information. A method for processing the operation information is separately as follows:

1) For touch information, when the user performs a touch operation on a side of the smartphone A based on the screenshot of the smartphone B, for example, performs an operation such as a swipe, a tap, a long press or a gesture, the smartphone A serializes a generated touch event MotionEvent into a byte stream and sends the byte stream. The smartphone B deserializes the byte stream, and restores the touch event. Alternatively, the smartphone A retrieves key information (including an event type, touch coordinates, touch force, and the like) in the touch event, encodes the key information into a file in a format such as xml or json. The smartphone B retrieves the key information according to the file in a format such as xml or json, and restores the touch event according to the key information. The smartphone B performs a corresponding control operation according to the restored touch event.

An xml format is used as an example, and the file obtained through encoding may be as follows:

```
<?xml version="1.0" encoding="UTF-8" ?>
<motionevent>
<surfacex>1080.0</surfacex>
<surfacey>1519.0</surfacey>
<extra>122.0</extra>
<action>0</action>
<pointlist><point><pointx>563.0</pointx><pointy>764.0</pointy></point></pointlist><pressure>0.31764707</pressure>
<size>0.0</size>
<metastate>0</metastate>
<buttonstate>0</buttonstate>
<xprecision>1.0</xprecision>
<yprecision>1.0</yprecision>
<edgeflags>0</edgeflags>
<source>4098</source>
<flags>0</flags>
</motionevent>
```

When the control terminal displays the screenshot of the controlled terminal, a resolution of the screenshot displayed in the control terminal is usually inconsistent with a resolution of a screen image actually displayed in the controlled terminal. Correspondingly, when the user performs a touch operation in the control terminal based on the screenshot of the controlled terminal, touch coordinates included in the generated touch event are also inconsistent with coordinates of the touch operation that are mapped in an actual screen image of the controlled terminal. For this, the control terminal first needs to convert touch coordinates in an original touch event into mapping coordinates mapped in the screen of the controlled terminal, replaces the touch coordinates in the original touch event with the mapping coordinates, and then generates touch information according to the touch event whose mapping coordinates are replaced. Specifically, the controlled terminal may send a resolution of the controlled terminal to the control terminal by using the control channel, and the control terminal determines the mapping coordinates according to display area coordinates of the screenshot, the touch coordinates in the original touch event, and the resolution of the screen of the controlled terminal.

Alternatively, the foregoing step of coordinate conversion may be completed by the controlled terminal, that is, the control terminal does not process an original touch event, and directly generates touch information, and the controlled terminal acquires the display area coordinates of the screenshot in the control terminal by using the control channel, retrieves touch coordinates of the original touch event from the touch information, and determines the mapping coordinates according to the display area coordinates of the screenshot, the retrieved touch coordinates, and the resolution of the screen of the controlled terminal.

Figure 3:
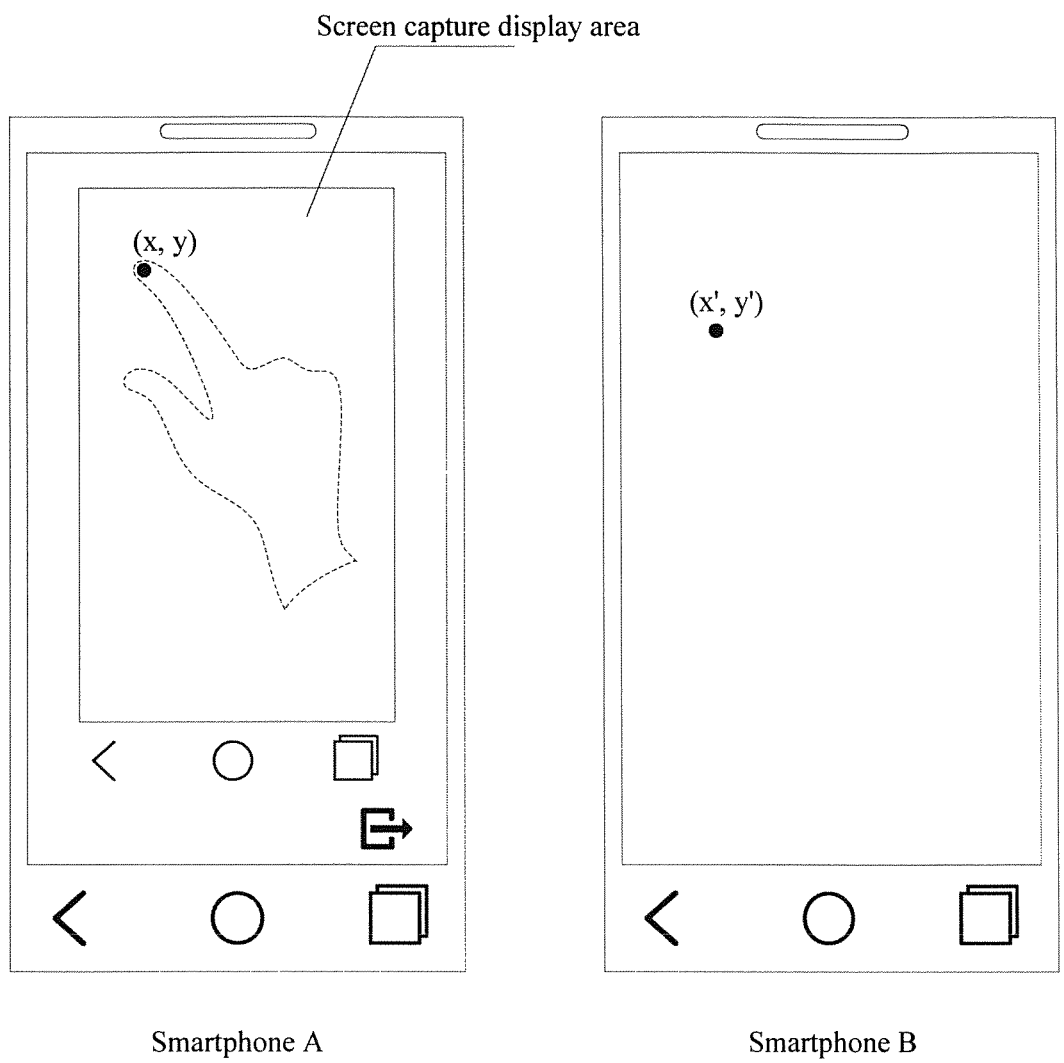
FIG. 3 is a schematic diagram of mapping of touch coordinates according to another embodiment of the present invention.

An example in which the foregoing step of coordinate conversion is completed by the control terminal is used. Refer to a schematic diagram of mapping of touch coordinates shown in FIG. 3. After the control channel and the data channel are established between the smartphone A and the smartphone B, the smartphone A receives the screen image data of the smartphone B, and displays the screenshot of the smartphone B in a screen capture display area in a screen of the smartphone A, where the screen capture display area is a part of the screen of the smartphone A. When the user performs a touch operation in the screen capture display area in the screen of the smartphone A, touch coordinates (x, y) included in the generated original touch event are coordinates of the touch point in the screen of the smartphone A. After obtaining the original touch event by monitoring, the smartphone A replaces the touch coordinates (x, y) in the original touch event with mapping coordinates (x', y') of the original touch event mapped in the screen of the controlled terminal, and generates touch information according to the touch event whose touch coordinates are replaced, for example, serialize the touch event whose touch coordinates are replaced, or performs retrieval and encoding by using the mapping coordinates (x', y') as key information.

Figure 4:
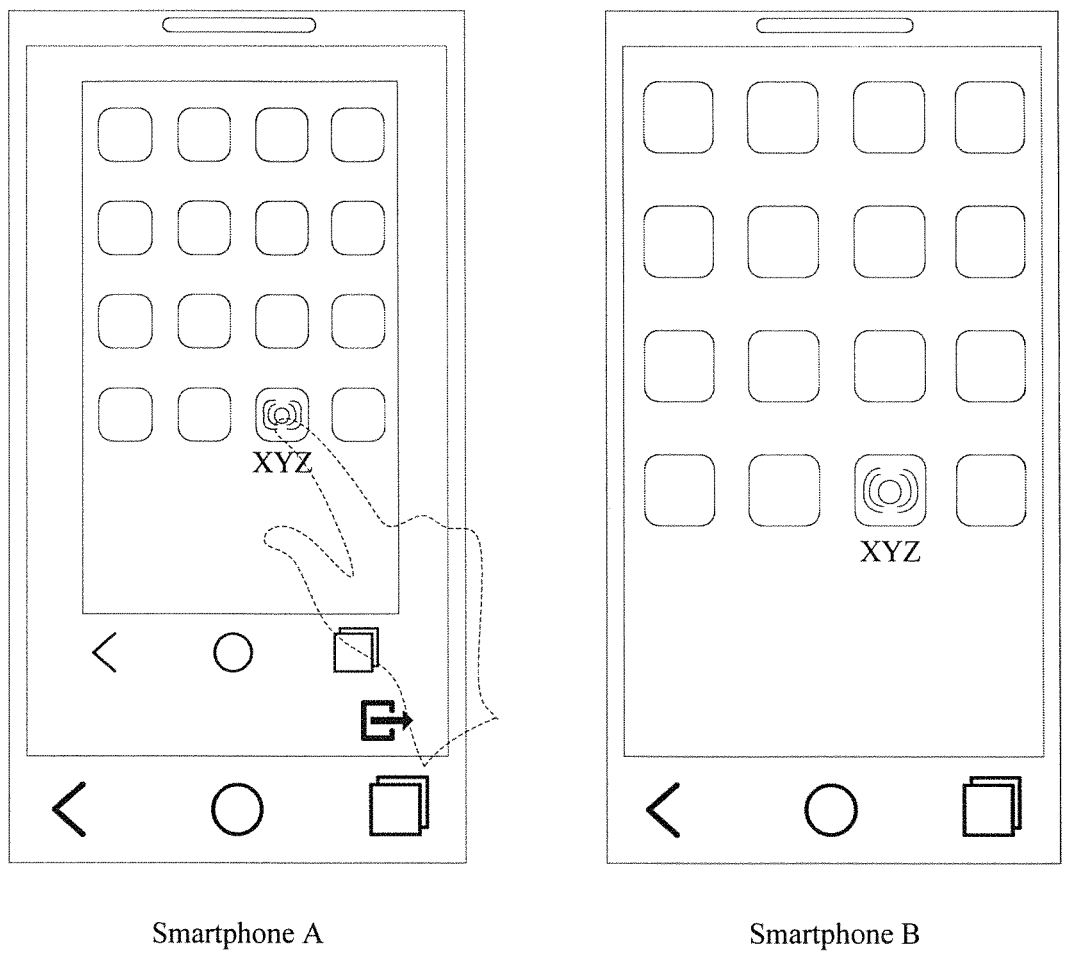
FIG. 4 is a schematic diagram of a remote control operation according to another embodiment of the present invention.

The user can control, in the control terminal, the controlled terminal by using a touch operation. For example, refer to a schematic diagram of a remote control operation shown in FIG. 4. After the control channel and the data channel are established between the smartphone A and the smartphone B, the smartphone A receives the screen image data of the smartphone B, and displays the screenshot of the smartphone B, where the screenshot is a screen capture of a home screen of the smartphone B, and the screenshot includes icons of application programs. When the user on the side of the smartphone A taps an icon area of an application program (the name of the program is "XYZ") in the screenshot, the smartphone A determines, according to coordinates of a touch point, mapping coordinates of the touch point that are mapped in the smartphone B, encodes the mapping coordinates and a touch type into touch information, and sends the touch information to the smartphone B. The smartphone B restores the touch event according to the touch information, and opens the application program XYZ according to the touch event. Further, after the smartphone B opens the application program XYZ and displays an application program interface of the application program XYZ, when the user taps, in the smartphone A, a position corresponding to a functional button (for example, to enter a subpage or exit the application program) in a screen capture of the application program interface, the smartphone B may control the application program according to the functional button.

Figure 5:
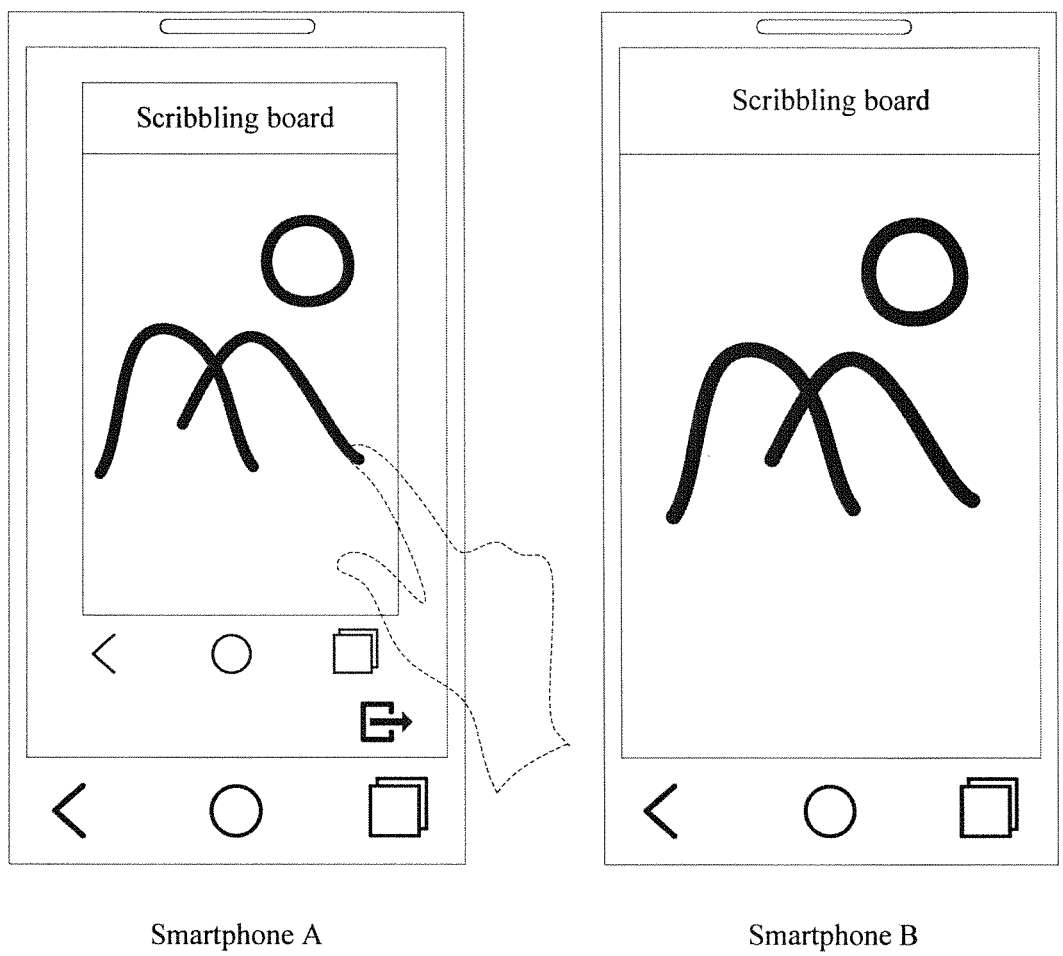
FIG. 5 is a schematic diagram of a remote scribbling operation according to another embodiment of the present invention.

Alternatively, the user may perform remote screen scribbling in the controlled terminal by using a touch operation. For example, refer to a schematic diagram of a remote scribbling operation shown in FIG. 5. After the control channel and the data channel are established between the smartphone A and the smartphone B, the smartphone B opens a scribbling panel, and the smartphone A receives the screen image data of the smartphone B, and displays a screen capture of the scribbling panel. The user on the side of the smartphone A performs a slide operation in the screen capture of the scribbling panel. The smartphone A determines, according to coordinates in a trajectory of the slide operation, mapping coordinates mapped in the smartphone B, encodes the mapping coordinates and a touch type into touch information, and sends the touch information to the smartphone B. The smartphone B restores the touch event according to the touch information, and displays, according to the touch event, a trajectory pattern of the slide operation in the scribbling panel displayed by the smartphone B.

2) For button information, the smartphone A may encode a button event (all physical buttons or virtual buttons such as a return button, a home button, a menu button, and a volume button) and define a unique identifier for each button type. The smartphone A encodes a button type corresponding to a button event into an identifier and sends the identifier to the smartphone B. The smartphone B restores the corresponding button event according to the identifier. The smartphone B performs a corresponding control operation according to the restored button event.

3) For voice information, the smartphone A first converts a voice into a text, retrieves a control instruction in the text, and defines a unique identifier for each control instruction. The smartphone A encodes the voice into an identifier and sends the identifier to the smartphone B, and the smartphone B restores a corresponding control instruction according to the identifier. For example, the user inputs a voice "Make a Call" to the smartphone A, the smartphone A encodes "Make a Call" into a unique identifier, and sends the identifier to the smartphone B, and the smartphone B recognizes the unique identifier as an instruction of "Make a Call". The smartphone B performs a corresponding control operation according to recognized instruction.

In conclusion, the control terminal provided in this embodiment of the present invention establishes a control channel and a data channel to a controlled terminal, receives screen image data that is sent by the controlled terminal by using the data channel, displays a screenshot of the controlled terminal according to the screen image data, generates corresponding operation information according to an operation that is based on the screenshot, and sends the operation information to the controlled terminal by using the control channel, so that the controlled terminal performs a corresponding control operation according to the operation information. In this way, two independent channels are used to transmit control information and the screen image data between two terminals, which avoids a problem that the screenshot, of the controlled terminal, displayed on a control terminal side cannot make a response to a user operation on the control terminal side in time because conflicts exist between screen data and the operation information in transmission logic and transmission time, thereby achieving objectives of improving a control effect and user experience.

Figure 6:
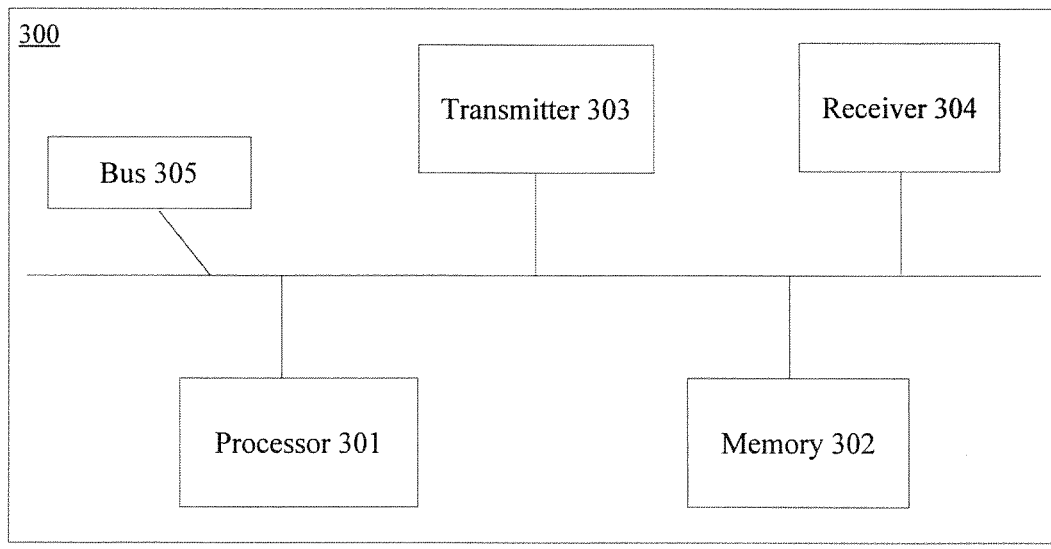
FIG. 6 is a block diagram of a control terminal according to an embodiment of the present invention.

Refer to FIG. 6, which is a block diagram of a control terminal according to an embodiment of the present invention. The control terminal 300 may be configured to perform remote control on a controlled terminal, where the control terminal and the controlled terminal may be mobile terminals each having a display unit and having a same operation mode, such as smartphones, tablet computers, and e-book readers. The control terminal 300 may include: a bus 305, and a processor 301, a memory 302, a transmitter 303, and a receiver 304 that are connected to the bus 305. The memory 302 is configured to store several instructions, where the several instructions are configured to be executed by the processor 301;

the processor 301 is configured to control the receiver 304 and the transmitter 303 to establish a control channel and a data channel to the controlled terminal;

the receiver 304 is configured to receive screen image data that is sent by the controlled terminal by using the data channel, where the screen image data is used to indicate a screenshot of the controlled terminal;

the processor 301 is configured to display the screenshot of the controlled terminal on a display device according to the screen image data, and generate corresponding operation information according to an operation that is based on the screenshot; and the processor 301 is configured to control the transmitter 303 to send the operation information to the controlled terminal by using the control channel, so that the controlled terminal performs a corresponding control operation according to the operation information.

In conclusion, the control terminal provided in this embodiment of the present invention establishes a control channel and a data channel to a controlled terminal, receives screen image data that is sent by the controlled terminal by using the data channel, displays a screenshot of the controlled terminal according to the screen image data, generates corresponding operation information according to an operation that is based on the screenshot, and sends the operation information to the controlled terminal by using the control channel, so that the controlled terminal performs a corresponding control operation according to the operation information. In this way, two independent channels are used to transmit control information and the screen image data between two terminals, which avoids a problem that the screenshot, of the controlled terminal, displayed on a control terminal side cannot make a response to a user operation on the control terminal side in time because conflicts exist between screen data and the operation information in transmission logic and transmission time, thereby achieving objectives of improving a control effect and user experience.

Figure 7:
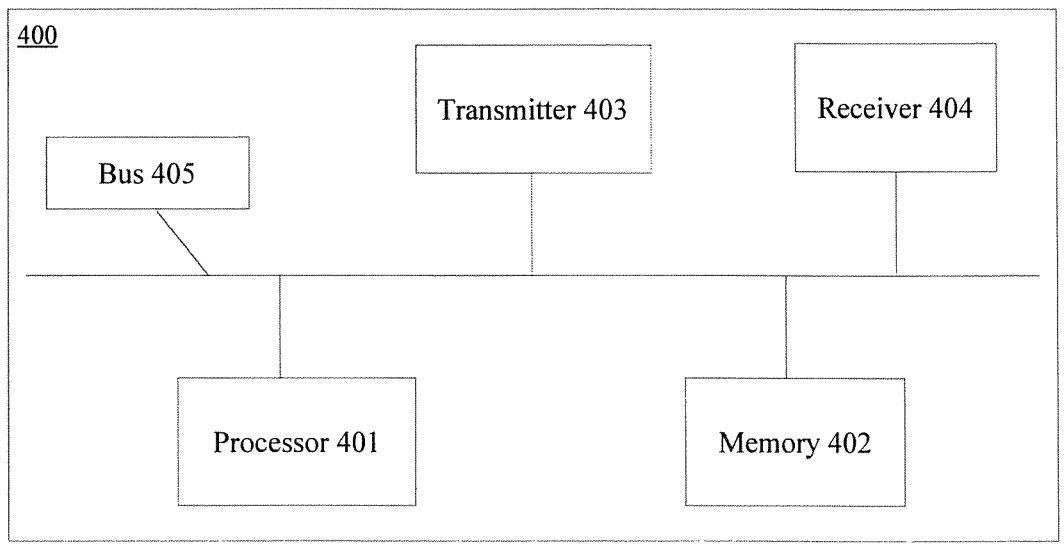
FIG. 7 is a block diagram of a control terminal according to another embodiment of the present invention.

Refer to FIG. 7, which is a block diagram of a control terminal according to another embodiment of the present invention. The control terminal 400 may be configured to perform remote control on a controlled terminal, where the control terminal and the controlled terminal may be mobile terminals each having a display unit and having a same operation mode, such as smartphones, tablet computers, and e-book readers. The control terminal 400 may include: a bus 405, and a processor 401, a memory 402, a transmitter 403 and a receiver 404 that are connected to the bus 405. The memory 402 is configured to store several instructions, where the several instructions are configured to be executed by the processor 401;

the processor 401 is configured to control the receiver 404 and the transmitter 403 to establish a control channel and a data channel to the controlled terminal;

the processor 401 is configured to control the receiver 404 and the transmitter 403 to establish the control channel to the controlled terminal by using the server; and the processor 401 is configured to control the receiver 404 and the transmitter 403 to establish the data channel to the controlled terminal by using the server and the control channel.

Specifically, when establishing the data channel, the processor 401 is configured to control the receiver 404 and the transmitter 403 to acquire address information of the control terminal from the server, where the address information includes a local address, a mapping address of network address translation, and a relay address of traversal using relays around network address translation;

the processor 401 is configured to control the receiver 404 and the transmitter 403 to acquire address information of the controlled terminal from the server or the controlled terminal;

the processor 401 is configured to determine a connection path according to the address information of the control terminal and the address information of the controlled terminal; and the processor 401 is configured to control the receiver 404 and the transmitter 403 to establish the data channel according to the connection path.

When determining the connection path, the processor 401 is configured to combine the address information of the control terminal and the address information of the controlled terminal into an address pair, perform a connectivity test on the address pair, and determine the connection path according to a result of the connectivity test.

For a procedure of establishing the control channel and the data channel, refer to the descriptions in the embodiment corresponding to FIG. 2, and details are no longer described herein.

The receiver 404 is configured to receive screen image data that is sent by the controlled terminal by using the data channel, where the screen image data is used to indicate a screenshot of the controlled terminal;

the processor 401 is configured to display the screenshot of the controlled terminal on a display device according to the screen image data, and generate corresponding operation information according to an operation that is based on the screenshot, where the operation information includes at least one of touch information, button information, and voice information, and the processor 401 is configured to: when the operation information is touch information, monitor a touch event corresponding to the operation, and generate the operation information according to the touch event;

the processor 401 is configured to: when the operation information is button information, determine a button type corresponding to the operation, and generate the operation information including an identifier corresponding to the button type; and the processor 401 is configured to: when the operation information is voice information, recognize a text from a voice corresponding to the operation, retrieve a control instruction included in the text, and generate the operation information including an identifier corresponding to the control instruction.

When generating the operation information according to the touch event, the processor 401 is configured to serialize the touch event into a byte stream, and generate the operation information including the byte stream; or the processor 401 is configured to retrieve key information of the touch event, encode the key information into a specified-format file, and generate the operation information including the specified-format file, where the key information includes an event type, touch coordinates, and/or touch force.

For a step of generating touch information, refer to the descriptions in the embodiment corresponding to FIG. 2, and details are no longer described herein.

The processor 401 is configured to control the transmitter 403 to send the operation information to the controlled terminal by using the control channel, so that the controlled terminal performs a corresponding control operation according to the operation information.

In conclusion, the control terminal provided in this embodiment of the present invention establishes a control channel and a data channel to a controlled terminal, receives screen image data that is sent by the controlled terminal by using the data channel, displays a screenshot of the controlled terminal according to the screen image data, generates corresponding operation information according to an operation that is based on the screenshot, and sends the operation information to the controlled terminal by using the control channel, so that the controlled terminal performs a corresponding control operation according to the operation information. In this way, two independent channels are used to transmit control information and the screen image data between two terminals, which avoids a problem that the screenshot, of the controlled terminal, displayed on a control terminal side cannot make a response to a user operation on the control terminal side in time because conflicts exist between screen data and the operation information in transmission logic and transmission time, thereby achieving objectives of improving a control effect and user experience.

Figure 8:
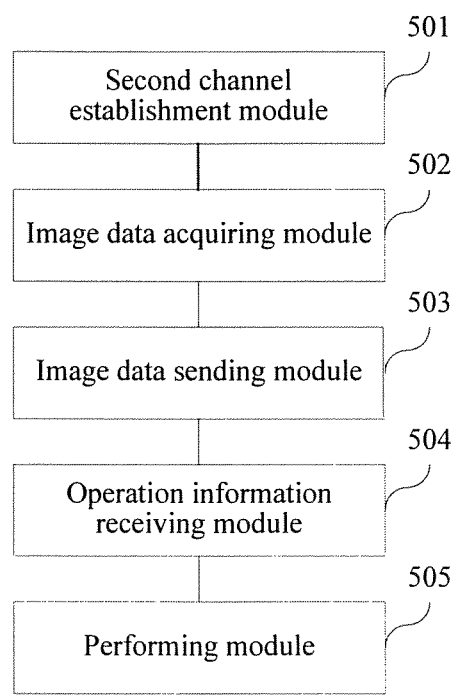
FIG. 8 is a schematic structural diagram of a controlled terminal according to an embodiment of the present invention.

Refer to FIG. 8, which is a schematic structural diagram of a controlled terminal according to an embodiment of the present invention. The controlled terminal is configured to receive remote control of the control terminal shown in any one of FIG. 1, FIG. 2, FIG. 6, and FIG. 7, where the control terminal and the controlled terminal may be mobile terminals each having a display unit and having a same operation mode, such as smartphones, tablet computers, and e-book readers. The controlled terminal may include:

a second channel establishment module 501, configured to establish a control channel and a data channel to the control terminal;

an image data acquiring module 502, configured to acquire screen image data used to indicate a screenshot of the controlled terminal;

an image data sending module 503, configured to send the screen image data to the control terminal by using the data channel, so that the control terminal displays the screenshot of the controlled terminal according to the screen data image;

an operation information receiving module 504, configured to receive operation information that is sent by the control terminal by using the control channel, where the operation information is information generated by the control terminal according to an operation that is based on the screenshot; and a performing module 505, configured to perform a corresponding control operation according to the operation information.

In conclusion, the controlled terminal provided in this embodiment of the present invention establishes a control channel and a data channel to a control terminal; and acquires screen image data of the controlled terminal, sends the screen image data to the control terminal by using the data channel, receives operation information that is sent by the control terminal by using the control channel, and performs a corresponding control operation according to the operation information. In this way, two independent channels are used to transmit control information and the screen image data between two terminals, which avoids a problem that a screenshot, of the controlled terminal, displayed on a control terminal side cannot make a response to a user operation on the control terminal side in time because conflicts exist between screen data and the operation information in transmission logic and transmission time, thereby achieving objectives of improving a control effect and user experience.

Figure 9:
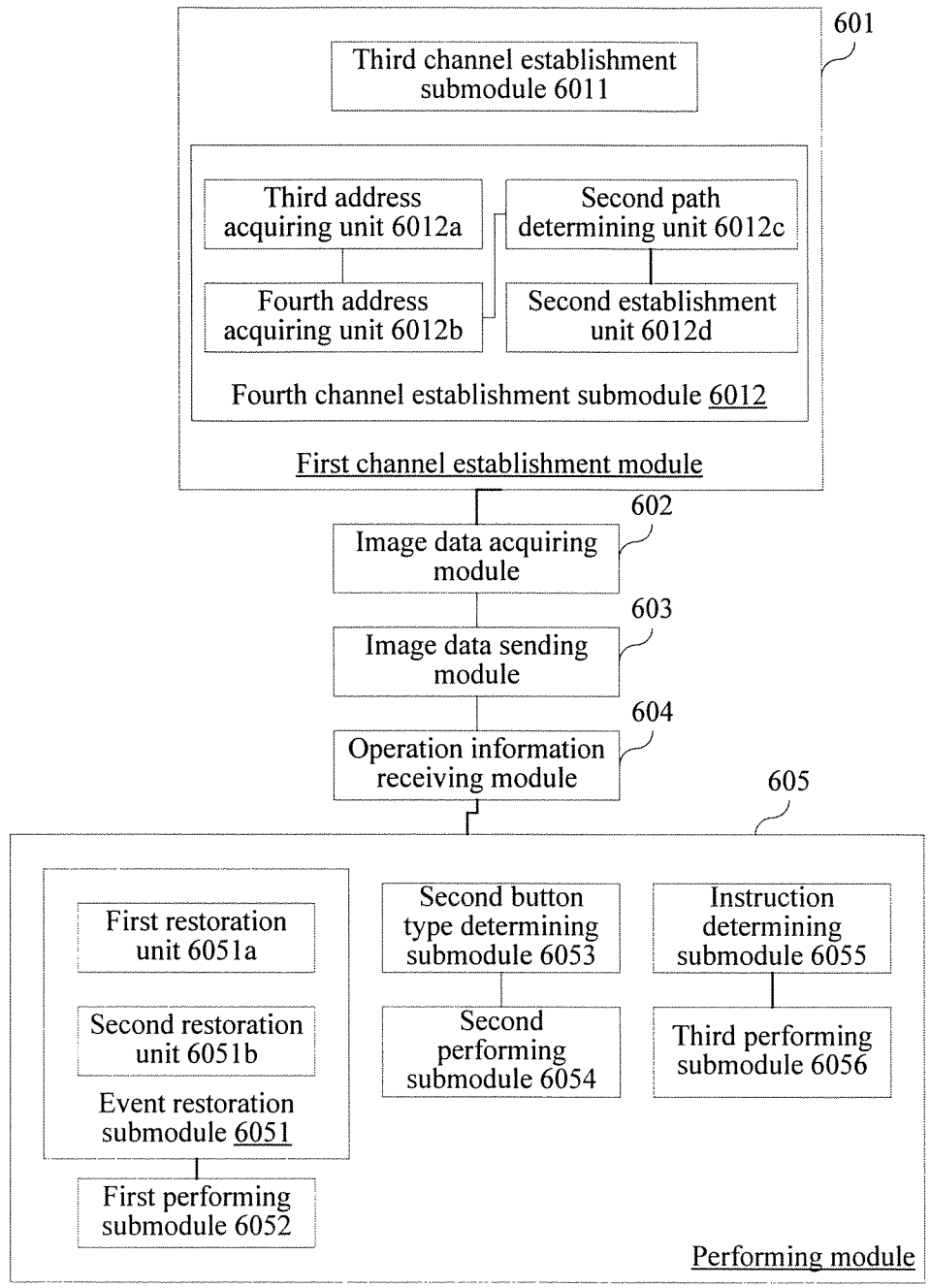
FIG. 9 is a schematic structural diagram of a controlled terminal according to another embodiment of the present invention.

Refer to FIG. 9, which is a schematic structural diagram of a controlled terminal according to another embodiment of the present invention. The controlled terminal is configured to receive remote control of the control terminal shown in any one of FIG. 1, FIG. 2, FIG. 6, and FIG. 7, where the control terminal and the controlled terminal may be mobile terminals each having a display unit and having a same operation mode, such as smartphones, tablet computers, and e-book readers. The controlled terminal may include:

A second channel establishment module 601 is configured to establish a control channel and a data channel to the control terminal.

The second channel establishment module 601 includes:

a third channel establishment submodule 6011, configured to establish the control channel to the control terminal by using the server; and a fourth channel establishment submodule 6012, configured to establish the data channel to the control terminal by using the server and the control channel.

The fourth channel establishment submodule 6012 includes:

a third address acquiring unit 6012*a*, configured to acquire address information of the controlled terminal from the server, where the address information includes a local address, a mapping address of network address translation, and a relay address of traversal using relays around network address translation;

a fourth address acquiring unit 6012*b*, configured to acquire address information of the control terminal from the server or the control terminal;

a second path determining unit 6012*c*, configured to determine a connection path according to the address information of the control terminal and the address information of the controlled terminal; and a second establishment unit 6012*d*, configured to establish the data channel according to the connection path.

When determining the connection path according to the address information of the control terminal and the address information of the controlled terminal, the controlled terminal combines the address information of the control terminal and the address information of the controlled terminal into an address pair, performs a connectivity test on the address pair, and determines the connection path according to a result of the connectivity test.

An example in which the control terminal and controlled terminal acquire and exchange the address information by using the server and the control channel, and establish the data channel according to the address information of the control terminal and the controlled terminal, establishment of the data channel may be initiated by the control terminal or the controlled terminal, and the control terminal proactively initiates establishment of the data channel is used. A specific procedure of the establishment may be as follows:

1) The control terminal initiates a data channel establishment instruction to the controlled terminal by using the control channel.

A smartphone A sends the data channel establishment instruction to a smartphone B by using the control channel in which a control channel server is used as a relay.

2) The control terminal acquires the address information of the control terminal from a data channel server.

The smartphone A sends an address collection request to the data channel server, and the data channel server returns address information of the smartphone A to the smartphone A according to the address collection request. The address information may include three types: a local address of a smartphone, a public mapping address of NAT (Network Address Translation, network address translation), and a relay address of TURN (Traversal Using Relays around NAT, traversal using relays around NAT).

3) The controlled terminal acquires the address information of the controlled terminal from the data channel server.

Similarly, after receiving the data channel establishment instruction, the smartphone B also sends an address collection request to the data channel server, and the data channel server returns address information of the smartphone B to the smartphone B according to the address collection request.

4) The controlled terminal acquires the address information of the control terminal from the control terminal by using the control channel.

The smartphone A sends the address information of the smartphone A to the smartphone B by using the control channel.

5) The controlled terminal determines a connection path according to the address information of the control terminal and the address information of the controlled terminal.

Similarly, the smartphone B combines three types of addresses of the smartphone B and three types of addresses of the smartphone A into address pairs, performs a connectivity test on the address pairs obtained by using combination, and determines an optimal path as a connection path according to a result of the connectivity test.

6) The controlled terminal establishes the data channel by using the determined connection path.

The control terminal may directly acquire the address information of the controlled terminal from the server. For example, the control terminal may send a request for collecting the address information of the controlled terminal to the server, the server sends the address information of the controlled terminal to the control terminal, and the control terminal determines the connection path and establishes the data channel according to the address information of the control terminal and the address information of the controlled terminal.

An image data acquiring module 602 is configured to acquire screen image data used to indicate a screenshot of the controlled terminal.

An image data sending module 603 is configured to send the screen image data to the control terminal by using the data channel, so that the control terminal displays the screenshot of the controlled terminal according to the screen data image.

An operation information receiving module 604 is configured to receive operation information that is sent by the control terminal by using the control channel, where the operation information is information generated by the control terminal according to an operation that is based on the screenshot.

A performing module 605 is configured to perform a corresponding control operation according to the operation information.

The operation information includes at least one of touch information, button information, and voice information, and the performing module 605 includes:

an event restoration submodule 6051, configured to: when the operation information is touch information, restore, according to the control information, a touch event corresponding to a touch operation;

a first performing submodule 6052, configured to perform the control operation according to the touch event;

a second button type determining submodule 6053, configured to: when the operation information is button information, determine, according to an identifier included in the operation information, a button type corresponding to a button operation;

a second performing submodule 6054, configured to perform the control operation according to the button type;

an instruction determining submodule 6055, configured to: when the operation information is voice information, determine, according to an identifier included in the operation information, a control instruction corresponding to a voice operation; and a third performing submodule 6056, configured to perform the control operation according to the control instruction.

The event restoration submodule includes: a first restoration unit 6051a or a second restoration unit 6051b.

The first restoration unit 6051a is configured to deserialize a byte stream included in the operation information, to restore the touch event.

The second restoration unit 6051b is configured to retrieve key information of the touch event from a specified-format file included in the operation information, and restore the touch event according to the key information, where the key information includes an event type, touch coordinates, and/or touch force.

For a specific process of receiving remote control of the control terminal by the controlled terminal, refer to the descriptions in the embodiment corresponding to FIG. 2, and details are no longer described herein.

In conclusion, the controlled terminal provided in this embodiment of the present invention establishes a control channel and a data channel to a control terminal; and acquires screen image data of the controlled terminal, sends the screen image data to the control terminal by using the data channel, receives operation information that is sent by the control terminal by using the control channel, and performs a corresponding control operation according to the operation information. In this way, two independent channels are used to transmit control information and the screen image data between two terminals, which avoids a problem that a screenshot, of the controlled terminal, displayed on a control terminal side cannot make a response to a user operation on the control terminal side in time because conflicts exist between screen data and the operation information in transmission logic and transmission time, thereby achieving objectives of improving a control effect and user experience.

Figure 10:
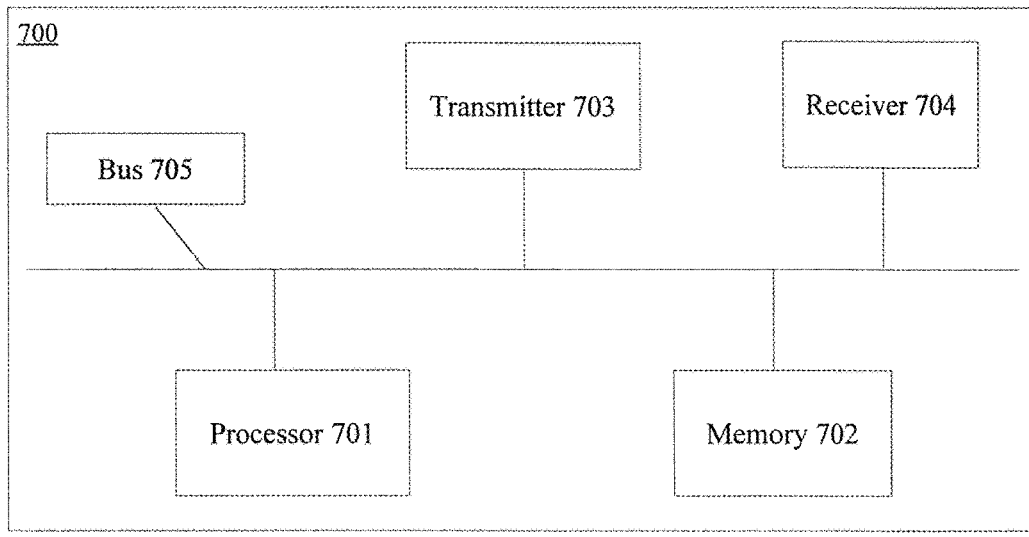
FIG. 10 is a block diagram of a controlled terminal according to an embodiment of the present invention.

Refer to FIG. 10, which is a block diagram of a controlled terminal of according to an embodiment of the present invention. The controlled terminal 700 is configured to receive remote control of the control terminal shown in any one of FIG. 1, FIG. 2, FIG. 6, and FIG. 7, where the control terminal and the controlled terminal may be mobile terminals each having a display unit and having a same operation mode, such as smartphones, tablet computers, and e-book readers. The controlled terminal 700 may include: a bus 705, and a processor 701, a memory 702, a transmitter 703, and a receiver 704 that are connected to the bus 705. The memory 702 is configured to store several instructions, where the several instructions are configured to be executed by the processor 701;

the processor 701 is configured to control the receiver 704 and the transmitter 703 to establish a control channel and a data channel to the control terminal;

the processor 701 is configured to acquire screen image data used to indicate a screenshot of the controlled terminal;

the processor 701 is configured to control the transmitter 703 to send the screen image data to the control terminal by using the data channel, so that the control terminal displays the screenshot of the controlled terminal according to the screen data image;

the receiver 704 is configured to receive operation information that is sent by the control terminal by using the control channel, where the operation information is information generated by the control terminal according to an operation that is based on the screenshot; and the processor 701 is configured to perform a corresponding control operation according to the operation information.

In conclusion, the controlled terminal provided in this embodiment of the present invention establishes a control channel and a data channel to a control terminal; and acquires screen image data of the controlled terminal, sends the screen image data to the control terminal by using the data channel, receives operation information that is sent by the control terminal by using the control channel is received, and performs a corresponding control operation according to the operation information. In this way, two independent channels are used to transmit control information and the screen image data between two terminals, which avoids a problem that a screenshot, of the controlled terminal, displayed on a control terminal side cannot make a response to a user operation on the control terminal side in time because conflicts exist between screen data and the operation information in transmission logic and transmission time, thereby achieving objectives of improving a control effect and user experience.

Figure 11:
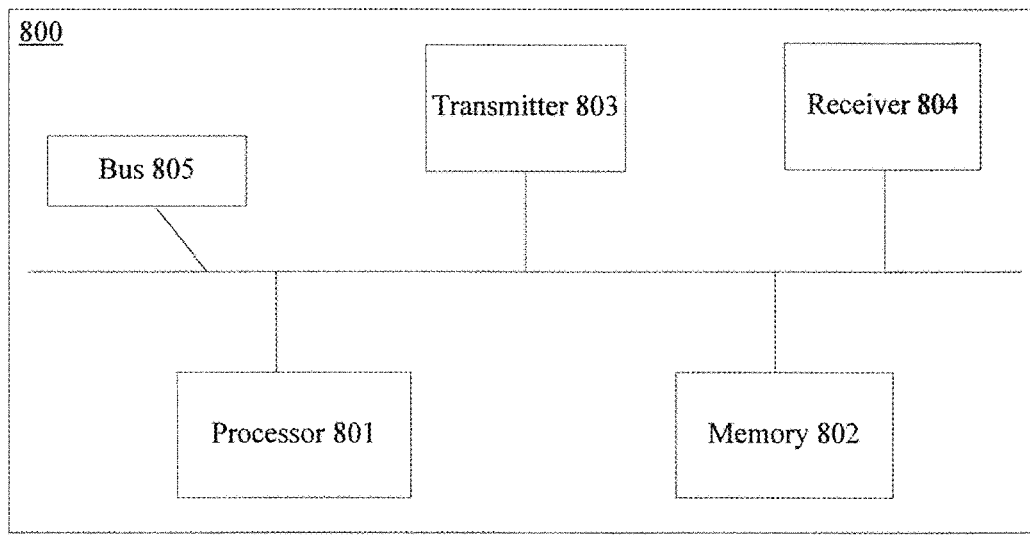
FIG. 11 is a block diagram of a controlled terminal according to another embodiment of the present invention.

Refer to FIG. 11, which is a block diagram of a controlled terminal according to another embodiment of the present invention. The controlled terminal 800 is configured to receive remote control of the control terminal shown in any one of FIG. 1, FIG. 2, FIG. 6, and FIG. 7, where the control terminal and the controlled terminal may be mobile terminals each having a display unit and having a same operation mode, such as smartphones, tablet computers, and e-book readers. The controlled terminal 800 may include: a bus 805, and a processor 801, a memory 802, a transmitter 803 and a receiver 804 that are connected to the bus 805. The memory 802 is configured to store several instructions, where the several instructions are configured to be executed by the processor 801;

the processor 801 is configured to control the receiver 804 and the transmitter 803 to establish a control channel and a data channel to the control terminal;

the processor 801 is configured to control the receiver 804 and the transmitter 803 to establish the control channel to the control terminal by using the server; and the processor 801 is configured to control the receiver 804 and the transmitter 803 to establish the data channel to the control terminal by using the server and the control channel.

When establishing the data channel, the processor 801 is configured to control the receiver 804 and the transmitter 803 to acquire address information of the controlled terminal from the server, where the address information includes a local address, a mapping address of network address translation, and a relay address of traversal using relays around network address translation;

the processor 801 is configured to control the receiver 804 and the transmitter 803 to acquire address information of the control terminal from the server or the control terminal;

the processor 801 is configured to determine a connection path according to the address information of the control terminal and the address information of the controlled terminal;

the processor 801 is configured to control the receiver 804 and the transmitter 803 to establish the data channel according to the connection path.

the processor 801 is configured to acquire screen image data used to indicate a screenshot of the controlled terminal;

the processor 801 is configured to control the transmitter 803 to send the screen image data to the control terminal by using the data channel, so that the control terminal displays the screenshot of the controlled terminal according to the screen data image;

the receiver 804 is configured to receive operation information that is sent by the control terminal by using the control channel, where the operation information is information generated by the control terminal according to an operation that is based on the screenshot; and the processor 801 is configured to perform a corresponding control operation according to the operation information.

The operation information includes at least one of touch information, button information, and voice information, and when performing the control operation, the processor 801 is configured to: when the operation information is touch information, restore, according to the control information, a touch event corresponding to a touch operation, and perform the control operation according to the touch event;

when restoring, according to the control information, the touch event corresponding to the touch operation, the processor 801 is configured to deserialize a byte stream included in the operation information, to restore the touch event; or the processor 801 is configured to retrieve key information of the touch event from a specified-format file included in the operation information, and restore the touch event according to the key information, where the key information includes an event type, touch coordinates, and/or touch force.

The processor 801 is configured to: when the operation information is button information, determine, according to an identifier included in the operation information, a button type corresponding to a button operation, and perform the control operation according to the button type.

The processor 801 is configured to: when the operation information is voice information, determine, according to an identifier included in the operation information, a control instruction corresponding to a voice operation, and perform the control operation according to the control instruction.

In conclusion, the controlled terminal provided in this embodiment of the present invention establishes a control channel and a data channel to a control terminal; and acquires screen image data of the controlled terminal, sends the screen image data to the control terminal by using the data channel, receives operation information that is sent by the control terminal by using the control channel, and performs a corresponding control operation according to the operation information. In this way, two independent channels are used to transmit control information and the screen image data between two terminals, which avoids a problem that a screenshot, of the controlled terminal, displayed on a control terminal side cannot make a response to a user operation on the control terminal side in time because conflicts exist between screen data and the operation information in transmission logic and transmission time, thereby achieving objectives of improving a control effect and user experience.

Figure 12:
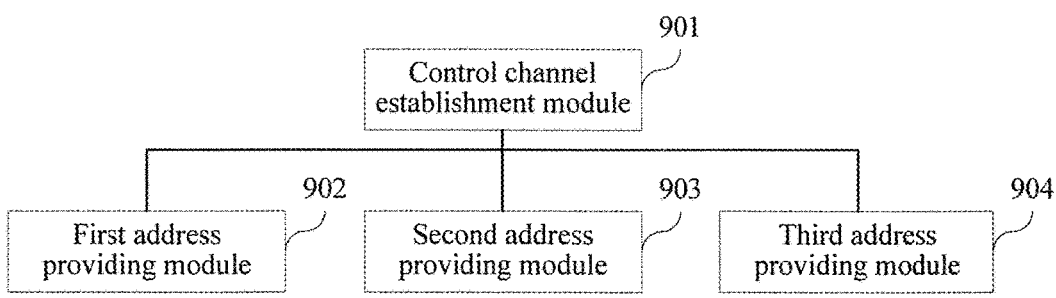
FIG. 12 is a schematic structural diagram of a server according to an embodiment of the present invention.

Refer to FIG. 12, which is a schematic structural diagram of a server according to an embodiment of the present invention. The server is configured to establish a connection between the control terminal shown in any one of FIG. 1, FIG. 2, FIG. 6, and FIG. 7 and the controlled terminal shown in any one of FIG. 8 to FIG. 11, so that the control terminal performs remote control on the controlled terminal, where the control terminal and the controlled terminal may be mobile terminals each having a display unit and having a same operation mode, such as smartphones, tablet computers, and e-book readers. The server may include:

a control channel establishment module 901, configured to establish a control channel between a control terminal and a controlled terminal;

a first address providing module 902, configured to provide address information of the control terminal to the control terminal, and provide address information of the controlled terminal to the controlled terminal, so that after the control terminal and the controlled terminal exchange the address information by using the control channel, the control terminal or the controlled terminal determines a connection path according to the address information of the control terminal and the address information of the controlled terminal, and establishes the data channel according to the connection path, and the control terminal performs control on the controlled terminal by using the control channel and the data channel;

a second address providing module 903, configured to provide address information of the control terminal and address information of the controlled terminal to the control terminal, so that the control terminal determines a connection path according to the address information of the control terminal and the address information of the controlled terminal, and establishes the data channel according to the connection path, and the control terminal performs control on the controlled terminal by using the control channel and the data channel; and a third address providing module 904 is configured to provide address information of the control terminal and address information of the controlled terminal to the controlled terminal, so that the controlled terminal determines a connection path according to the address information of the control terminal and the address information of the controlled terminal, and establishes the data channel according to the connection path, and the control terminal performs control on the controlled terminal by using the control channel and the data channel.

In conclusion, the server provided in this embodiment of the present invention establishes a control channel and a data channel between a control terminal and a controlled terminal; and the control terminal performs control on the controlled terminal by using the control channel and the data channel. In this way, two independent channels are used to transmit control information and screen image data between two terminals, which avoids a problem that a screenshot, of the controlled terminal, displayed on a control terminal side cannot make a response to a user operation on the control terminal side in time because conflicts exist between screen data and operation information in transmission logic and transmission time, thereby achieving objectives of improving a control effect and user experience.

Figure 13:
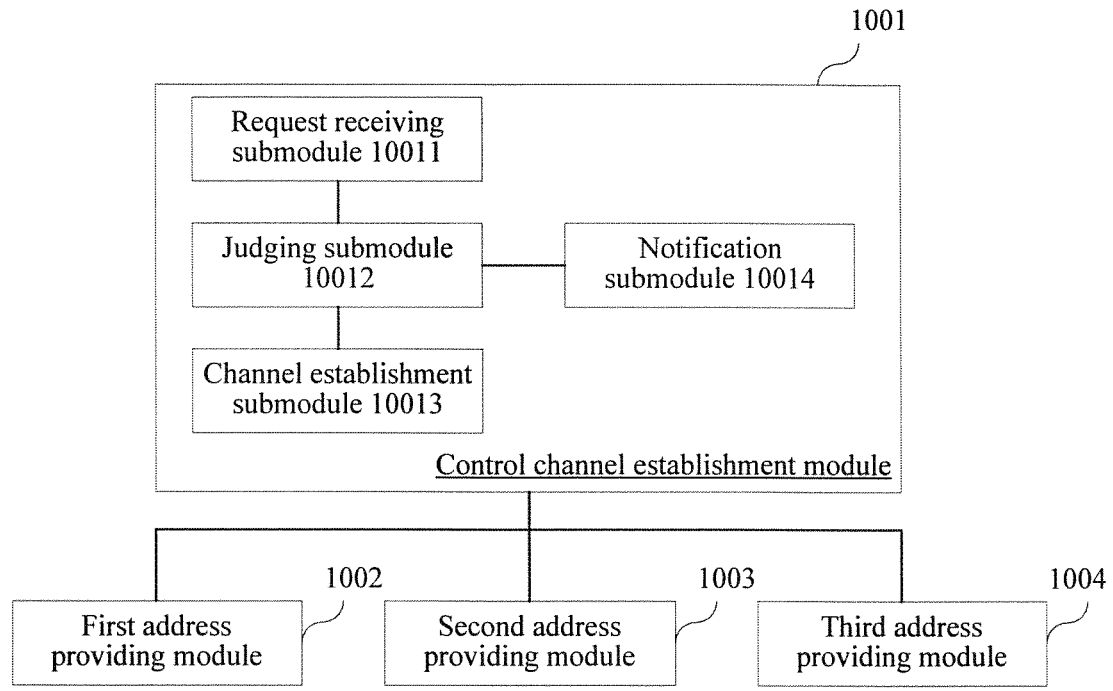
FIG. 13 is a schematic structural diagram of a server according to another embodiment of the present invention.

Refer to FIG. 13, which is a schematic structural diagram of a server according to another embodiment of the present invention. The server is configured to establish a connection between the control terminal shown in any one of FIG. 1, FIG. 2, FIG. 6, and FIG. 7 and the controlled terminal shown in any one of FIG. 8 to FIG. 11, so that the control terminal performs remote control on the controlled terminal, where the control terminal and the controlled terminal may be mobile terminals each having a display unit and having a same operation mode, such as smartphones, tablet computers, and e-book readers. The server may include:

A control channel establishment module 1001 is configured to establish a control channel between a control terminal and a controlled terminal.

The control channel establishment module 1001 includes:

a request receiving submodule 10011, configured to: after the control terminal is connected to the server, receive a control channel establishment request sent by the control terminal;

a judging submodule 10012, configured to determine whether the controlled terminal is already connected to the server; and a channel establishment submodule 10013, configured to: if a determining result of the judging submodule 10012 is that the controlled terminal is already connected to the server, establish the control channel between the control terminal and the controlled terminal.

The control channel establishment module 1001 further includes:

a notification submodule 10014, configured to: if the determining result of the judging submodule 10012 is that the controlled terminal is not connected to the server, send a connection notification to the controlled terminal, where the connection notification is used to instruct to connect the controlled terminal to the server.

A first address providing module 1002 is configured to provide address information of the control terminal to the control terminal, and provide address information of the controlled terminal to the controlled terminal, so that after the control terminal and the controlled terminal exchange the address information by using the control channel, the control terminal or the controlled terminal determines a connection path according to the address information of the control terminal and the address information of the controlled terminal, and establishes the data channel according to the connection path, and the control terminal performs control on the controlled terminal by using the control channel and the data channel;

a second address providing module 1003 is configured to provide address information of the control terminal and address information of the controlled terminal to the control terminal, so that the control terminal determines a connection path according to the address information of the control terminal and the address information of the controlled terminal, and establishes the data channel according to the connection path, and the control terminal performs control on the controlled terminal by using the control channel and the data channel; and a third address providing module 1004 is configured to provide address information of the control terminal and address information of the controlled terminal to the controlled terminal, so that the controlled terminal determines a connection path according to the address information of the control terminal and the address information of the controlled terminal, and establishes the data channel according to the connection path, and the control terminal performs control on the controlled terminal by using the control channel and the data channel.

For a process of establishing the control channel and the data channel and a process of performing control on the controlled terminal by the control terminal by using the control channel and the data channel, refer to the descriptions in the embodiment shown in FIG. 2, and details are no longer described herein.

In conclusion, the server provided in this embodiment of the present invention establishes a control channel and a data channel between a control terminal and a controlled terminal; and the control terminal performs control on the controlled terminal by using the control channel and the data channel. In this way, two independent channels are used to transmit control information and screen image data between two terminals, which avoids a problem that a screenshot, of the controlled terminal, displayed on a control terminal side cannot make a response to a user operation on the control terminal side in time because conflicts exist between screen data and operation information in transmission logic and transmission time, thereby achieving objectives of improving a control effect and user experience.

Figure 14:
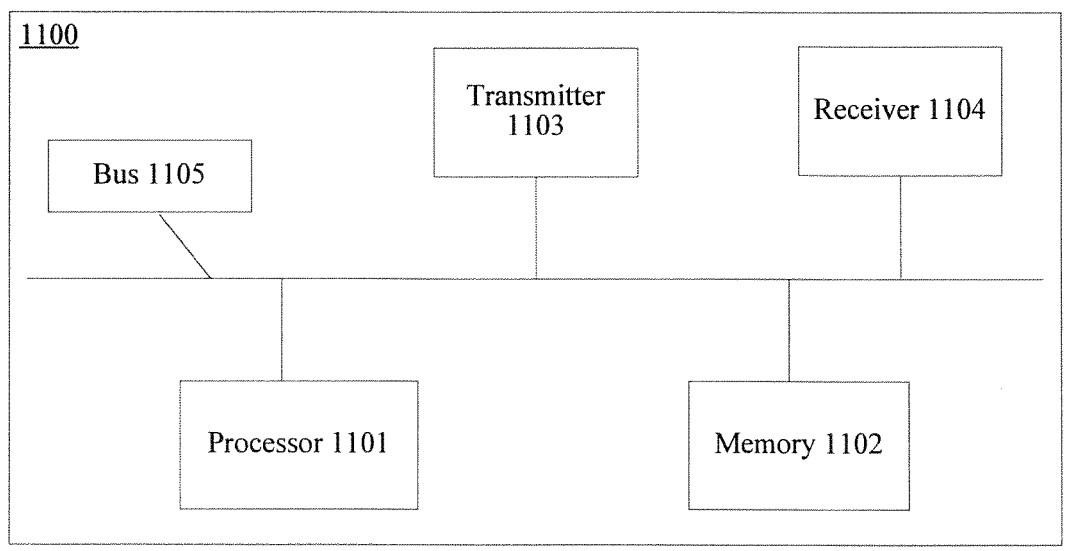
FIG. 14 is a block diagram of a server according to an embodiment of the present invention.

Refer to FIG. 14, which is a block diagram of a server according to an embodiment of the present invention. The server 1100 is configured to establish a connection between the control terminal shown in any one of FIG. 1, FIG. 2, FIG. 6, and FIG. 7 and the controlled terminal shown in any one of FIG. 8 to FIG. 11, so that the control terminal performs remote control on the controlled terminal, where the control terminal and the controlled terminal may be mobile terminals each having a display unit and having a same operation mode, such as smartphones, tablet computers, and e-book readers. The server 1100 includes: a bus 1105, and a processor 1101, a memory 1102, a transmitter 1103, and a receiver 1104 that are connected to the bus. The memory 1102 is configured to store several instructions, where the several instructions are configured to be executed by the processor 1101;

the processor 1101 is configured to control the receiver 1104 and the transmitter 1103 to establish a control channel between a control terminal and a controlled terminal; and the processor 1101 is configured to control the receiver 1104 and the transmitter 1103 to provide address information of the control terminal to the control terminal, and provide address information of the controlled terminal to the controlled terminal, so that after the control terminal and the controlled terminal exchange the address information by using the control channel, the control terminal or the controlled terminal determines a connection path according to the address information of the control terminal and the address information of the controlled terminal, and establishes the data channel according to the connection path, and the control terminal performs control on the controlled terminal by using the control channel and the data channel; or the processor is configured to provide address information of the control terminal and address information of the controlled terminal to the control terminal, so that the control terminal determines a connection path according to the address information of the control terminal and the address information of the controlled terminal, and establishes the data channel according to the connection path, and the control terminal performs control on the controlled terminal by using the control channel and the data channel; or the processor is configured to provide address information of the control terminal and address information of the controlled terminal to the controlled terminal, so that the controlled terminal determines a connection path according to the address information of the control terminal and the address information of the controlled terminal, and establishes the data channel according to the connection path, and the control terminal performs control on the controlled terminal by using the control channel and the data channel.

In conclusion, the server provided in this embodiment of the present invention establishes a control channel and a data channel between a control terminal and a controlled terminal; and the control terminal performs control on the controlled terminal by using the control channel and the data channel. In this way, two independent channels are used to transmit control information and screen image data between two terminals, which avoids a problem that a screenshot, of the controlled terminal, displayed on a control terminal side cannot make a response to a user operation on the control terminal side in time because conflicts exist between screen data and operation information in transmission logic and transmission time, thereby achieving objectives of improving a control effect and user experience.

Figure 15:
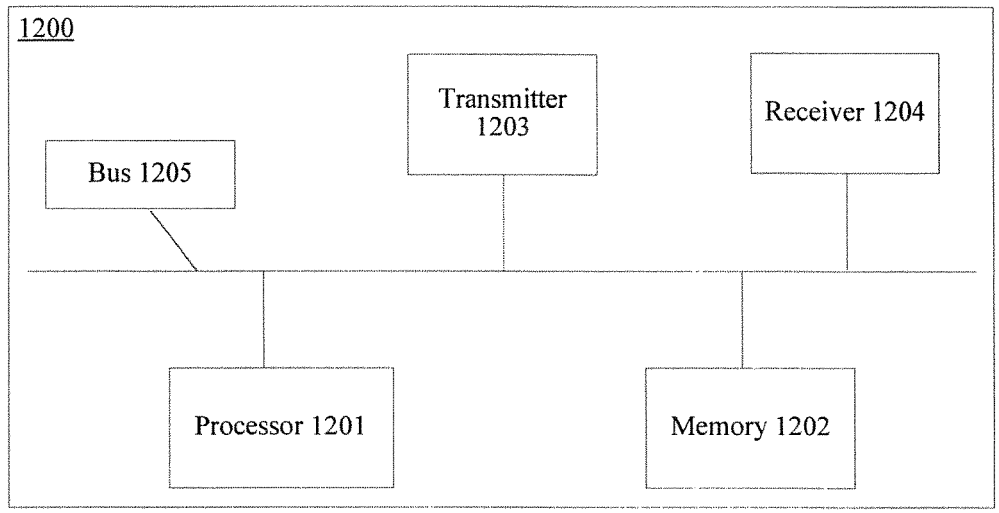
FIG. 15 is a block diagram of a server according to another embodiment of the present invention.

Refer to FIG. 15, which is a block diagram of a server according to another embodiment of the present invention. The server 1200 is configured to establish a connection between the control terminal shown in any one of FIG. 1, FIG. 2, FIG. 6, and FIG. 7 and the controlled terminal shown in any one of FIG. 8 to FIG. 11, so that the control terminal performs remote control on the controlled terminal, where the control terminal and the controlled terminal may be mobile terminals each having a display unit and having a same operation mode, such as smartphones, tablet computers, and e-book readers. The server 1200 includes: a bus 1205, and a processor 1201, a memory 1202, a transmitter 1203 and a receiver 1204 that are connected to the bus. The memory 1202 is configured to store several instructions, where the several instructions are configured to be executed by the processor 1201;

the processor 1201 is configured to control the receiver 1204 and the transmitter 1203 to establish a control channel between a control terminal and a controlled terminal;

when the control channel between the control terminal and the controlled terminal is established, the receiver 1204 is configured to: after the control terminal is connected to the server, receive a control channel establishment request sent by the control terminal; and the processor 1201 is configured to determine whether the controlled terminal is already connected to the server; and if a determining result is that the controlled terminal is already connected to the server, control the receiver 1204 and the transmitter 1203 to establish the control channel between the control terminal and the controlled terminal.

The processor 1201 is configured to: if the determining result is that the controlled terminal is not connected to the server, control the transmitter 1203 to send a connection notification to the controlled terminal, where the connection notification is used to instruct to connect the controlled terminal to the server.

The processor 1201 is configured to control the receiver 1204 and the transmitter 1203 to provide address information of the control terminal to the control terminal, and provide address information of the controlled terminal to the controlled terminal, so that after the control terminal and the controlled terminal exchange the address information by using the control channel, the control terminal or the controlled terminal determines a connection path according to the address information of the control terminal and the address information of the controlled terminal, and establishes the data channel according to the connection path, and the control terminal performs control on the controlled terminal by using the control channel and the data channel; or the processor is configured to provide address information of the control terminal and address information of the controlled terminal to the control terminal, so that the control terminal determines a connection path according to the address information of the control terminal and the address information of the controlled terminal, and establishes the data channel according to the connection path, and the control terminal performs control on the controlled terminal by using the control channel and the data channel; or the processor is configured to provide address information of the control terminal and address information of the controlled terminal to the controlled terminal, so that the controlled terminal determines a connection path according to the address information of the control terminal and the address information of the controlled terminal, and establishes the data channel according to the connection path, and the control terminal performs control on the controlled terminal by using the control channel and the data channel.

For a process of establishing the control channel and the data channel and a process of performing control on the controlled terminal by the control terminal by using the control channel and the data channel, refer to the descriptions in the embodiment shown in FIG. 2, and details are no longer described herein.

In conclusion, the server provided in this embodiment of the present invention establishes a control channel and a data channel between a control terminal and a controlled terminal; and the control terminal performs control on the controlled terminal by using the control channel and the data channel. In this way, two independent channels are used to transmit control information and screen image data between two terminals, which avoids a problem that a screenshot, of the controlled terminal, displayed on a control terminal side cannot make a response to a user operation on the control terminal side in time because conflicts exist between screen data and operation information in transmission logic and transmission time, thereby achieving objectives of improving a control effect and user experience.

Figure 16:
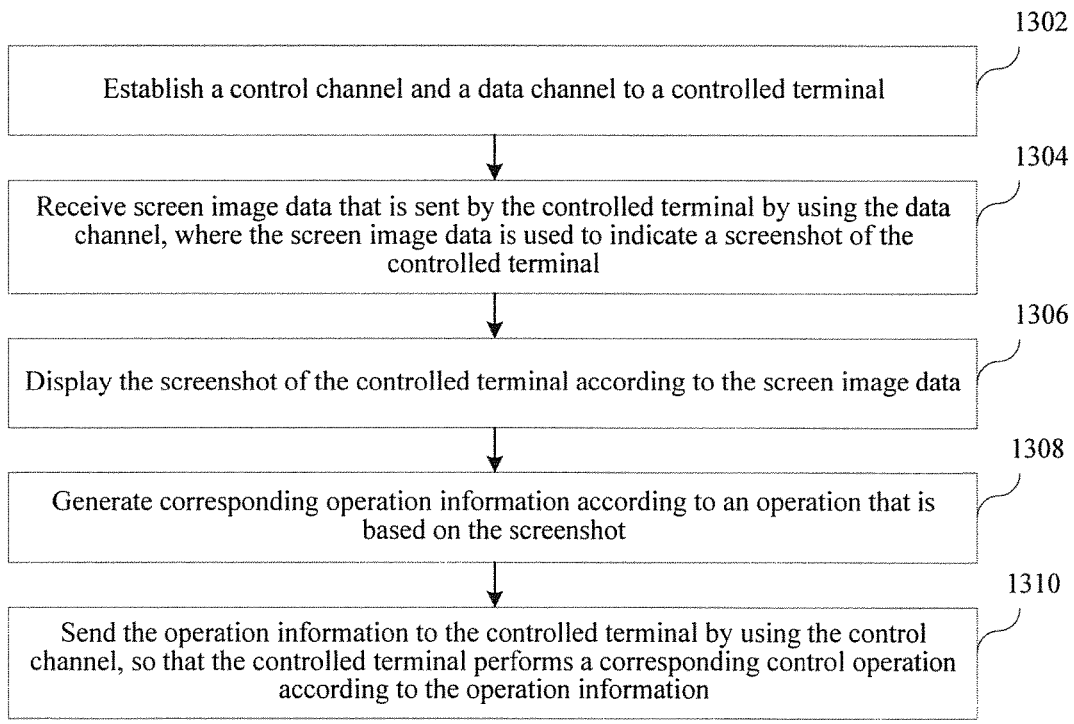
FIG. 16 is a method flowchart of a terminal control method according to an embodiment of the present invention.

Refer to FIG. 16, which is a method flowchart of a terminal control method according to an embodiment of the present invention. The method may be used in the control terminal shown in any one of FIG. 1, FIG. 2, FIG. 6, and FIG. 7 to perform remote control on a controlled terminal, where the control terminal and the controlled terminal may be mobile terminals each having a display unit and having a same operation mode, such as smartphones, tablet computers, and e-book readers. The method may include:

Step 1302: Establish a control channel and a data channel to the controlled terminal.

Step 1304: Receive screen image data that is sent by the controlled terminal by using the data channel, where the screen image data is used to indicate a screenshot of the controlled terminal.

Step 1306: Display the screenshot of the controlled terminal according to the screen image data.

Step 1308: Generate corresponding operation information according to an operation that is based on the screenshot.

Step 1310: Send the operation information to the controlled terminal by using the control channel, so that the controlled terminal performs a corresponding control operation according to the operation information.

In conclusion, according to the terminal control method provided in this embodiment of the present invention, a control channel and a data channel are established to a controlled terminal, screen image data that is sent by the controlled terminal by using the data channel is received, a screenshot of the controlled terminal is displayed according to the screen image data, corresponding operation information is generated according to an operation that is based on the screenshot, and the operation information is sent to the controlled terminal by using the control channel, so that the controlled terminal performs a corresponding control operation according to the operation information. In this way, two independent channels are used to transmit control information and the screen image data between two terminals, which avoids a problem that the screenshot, of the controlled terminal, displayed on a control terminal side cannot make a response to a user operation on the control terminal side in time because conflicts exist between screen data and the operation information in transmission logic and transmission time, thereby achieving objectives of improving a control effect and user experience.

Figure 17:
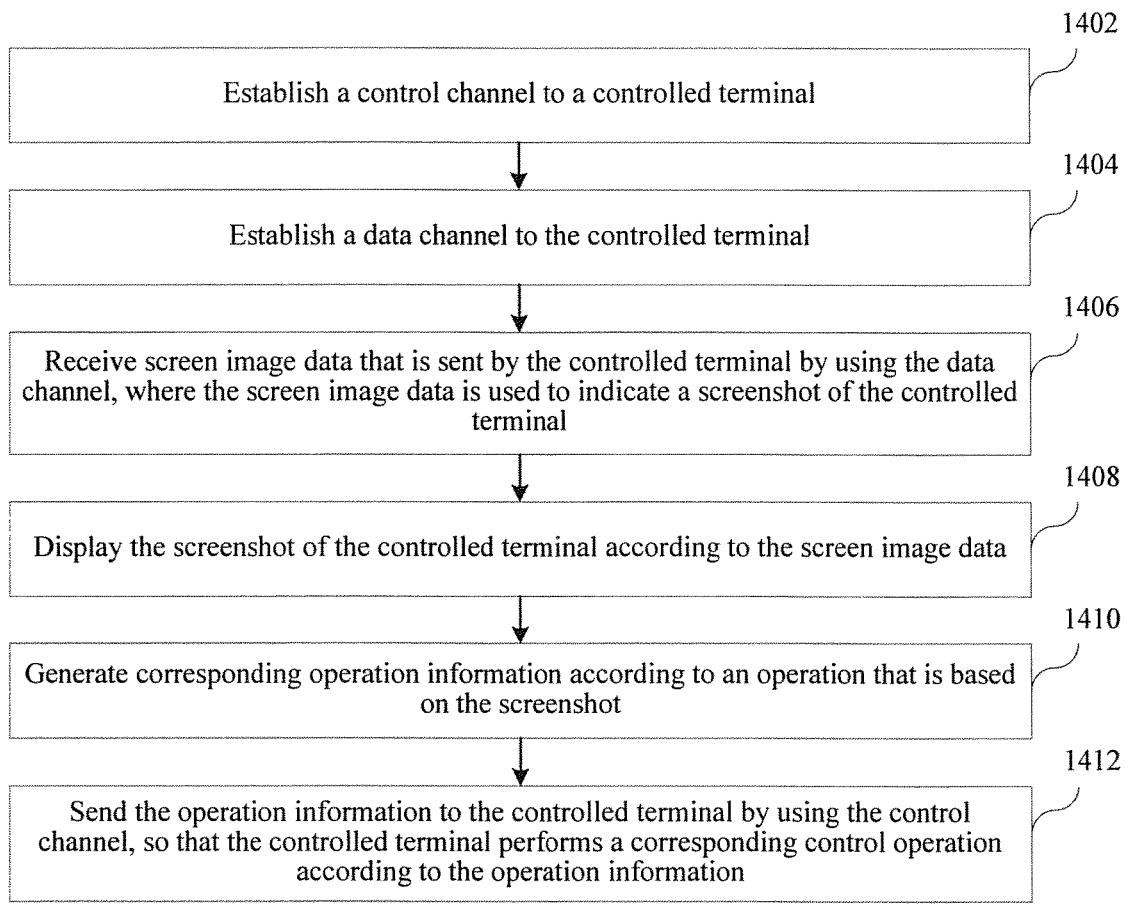
FIG. 17 is a method flowchart of a terminal control method according to another embodiment of the present invention.

Refer to FIG. 17, which is a method flowchart of a terminal control method according to another embodiment of the present invention. The method may be used in the control terminal shown in any one of FIG. 1, FIG. 2, FIG. 6, and FIG. 7 to perform remote control on a controlled terminal, where the control terminal and the controlled terminal may be mobile terminals each having a display unit and having a same operation mode, such as smartphones, tablet computers, and e-book readers. The method may include:

Step 1402: Establish a control channel to a controlled terminal.

When a user wants to control the controlled terminal in a control terminal, the user may establish the control channel to the controlled terminal by using a control channel server.

Alternatively, the control channel may be directly established between a control terminal and the controlled terminal without using a server.

Step 1404: Establish a data channel to the controlled terminal.

The control terminal may establish the data channel to the controlled terminal by using the server and the control channel.

The control terminal may acquire address information of the control terminal from the server, where the address information includes a local address, a mapping address of network address translation, and a relay address of traversal using relays around network address translation; the control terminal acquires address information of the controlled terminal from the server or the controlled terminal; the control terminal determines a connection path according to the address information of the control terminal and the address information of the controlled terminal; and the control terminal establishes the data channel according to the connection path.

When determining the connection path according to the address information of the control terminal and the address information of the controlled terminal, the control terminal combines the address information of the control terminal and the address information of the controlled terminal into an address pair, performs a connectivity test on the address pair, and determines the connection path according to a result of the connectivity test.

Alternatively, the data channel may be directly established between the control terminal and the controlled terminal without using the server.

For a procedure of establishing the control channel and the data channel, refer to the descriptions in the embodiment corresponding to FIG. 2, and details are no longer described herein.

Step 1406: Receive screen image data that is sent by the controlled terminal by using the data channel, where the screen image data is used to indicate a screenshot of the controlled terminal.

Step 1408: Display the screenshot of the controlled terminal according to the screen image data.

Step 1410: Generate corresponding operation information according to an operation that is based on the screenshot.

For a procedure of generating the operation information, refer to the descriptions in the embodiment corresponding to FIG. 2, and details are no longer described herein.

Step 1412: Send the operation information to the controlled terminal by using the control channel, so that the controlled terminal performs a corresponding control operation according to the operation information.

In conclusion, according to the terminal control method provided in this embodiment of the present invention, a control channel and a data channel are established to a controlled terminal, screen image data that is sent by the controlled terminal by using the data channel is received, a screenshot of the controlled terminal is displayed according to the screen image data, corresponding operation information is generated according to an operation that is based on the screenshot, and the operation information is sent to the controlled terminal by using the control channel, so that the controlled terminal performs a corresponding control operation according to the operation information. In this way, two independent channels are used to transmit control information and the screen image data between two terminals, which avoids a problem that the screenshot, of the controlled terminal, displayed on a control terminal side cannot make a response to a user operation on the control terminal side in time because conflicts exist between screen data and the operation information in transmission logic and transmission time, thereby achieving objectives of improving a control effect and user experience.

Figure 18:
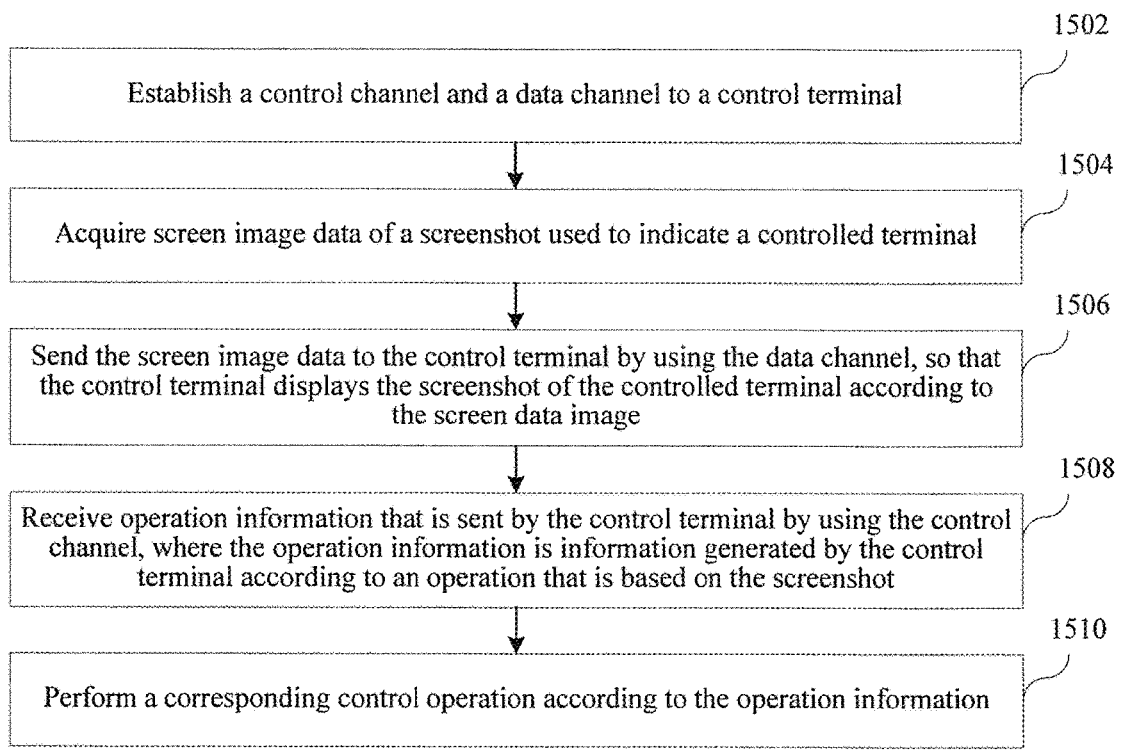
FIG. 18 is a method flowchart of a terminal control method according to an embodiment of the present invention.

Refer to FIG. 18, which is a method flowchart of a terminal control method according to an embodiment of the present invention. The method is used in the controlled terminals shown in FIG. 8 to FIG. 11, so that the controlled terminal receives remote control of a control terminal, where the control terminal and the controlled terminal may be mobile terminals each having a display unit and having a same operation mode, such as smartphones, tablet computers, and e-book readers. The method may include:

Step 1502: Establish a control channel and a data channel to the control terminal.

Step 1504: Acquire screen image data of a screenshot used to indicate the controlled terminal.

Step 1506: Send the screen image data to the control terminal by using the data channel, so that the control terminal displays the screenshot of the controlled terminal according to the screen data image.

Step 1508: Receive operation information that is sent by the control terminal by using the control channel, where the operation information is information generated by the control terminal according to an operation that is based on the screenshot.

Step 1510: Perform a corresponding control operation according to the operation information.

In conclusion, according to the method provided in this embodiment of the present invention, a control channel and a data channel is established to a control terminal; screen image data of the controlled terminal is acquired, the screen image data is sent to the control terminal by using the data channel, operation information that is sent by the control terminal by using the control channel is received, and a corresponding control operation is performed according to the operation information. In this way, two independent channels are used to transmit control information and the screen image data between two terminals, which avoids a problem that a screenshot, of the controlled terminal, displayed on a control terminal side cannot make a response to a user operation on the control terminal side in time because conflicts exist between screen data and the operation information in transmission logic and transmission time, thereby achieving objectives of improving a control effect and user experience.

Figure 19:
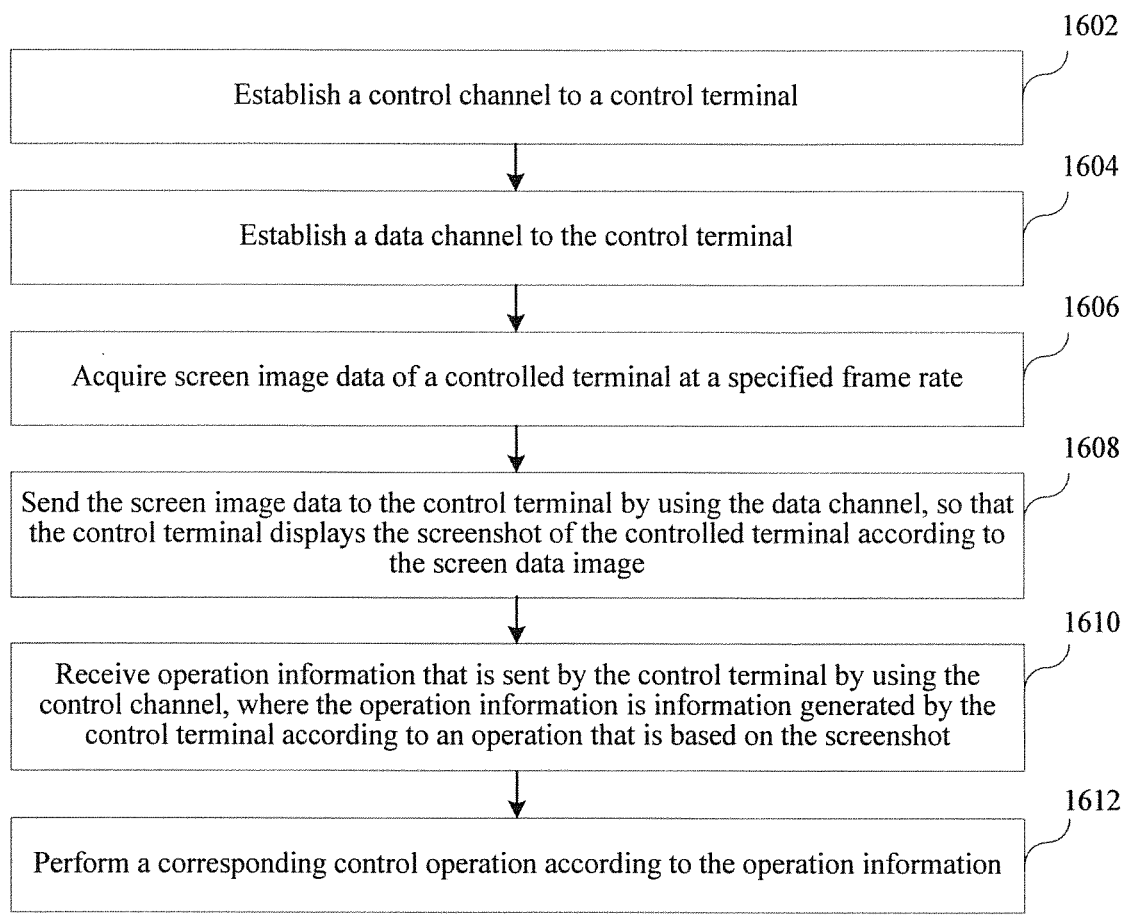
FIG. 19 is a method flowchart of a terminal control method according to another embodiment of the present invention.

Refer to FIG. 19, which is a method flowchart of a terminal control method according to another embodiment of the present invention. The method is used in the controlled terminals shown in FIG. 8 to FIG. 11, so that the controlled terminal receives remote control of a control terminal, where the control terminal and the controlled terminal may be mobile terminals each having a display unit and having a same operation mode, such as smartphones, tablet computers, and e-book readers. The method may include:

Step 1602: Establish a control channel to a control terminal.

Step 1604: Establish a data channel to the control terminal.

For a process of establishing the control channel and the data channel, refer to the descriptions in the embodiment corresponding to FIG. 2, and details are no longer described herein.

Step 1606: Acquire screen image data of the controlled terminal at a specified frame rate.

The screen image data is used to indicate a screenshot of the controlled terminal.

Step 1608: Send the screen image data to the control terminal by using the data channel, so that the control terminal displays the screenshot of the controlled terminal according to the screen data image.

Step 1610: Receive operation information that is sent by the control terminal by using the control channel, where the operation information is information generated by the control terminal according to an operation that is based on the screenshot.

Step 1612: Perform a corresponding control operation according to the operation information.

For a procedure in which the control terminal generates and sends the operation information and a procedure in which the controlled terminal performs the corresponding control operation according to the operation information, refer to the descriptions in the embodiment corresponding to FIG. 2, and details are no longer described herein.

In conclusion, according to the method provided in this embodiment of the present invention, a control channel and a data channel are established to a control terminal; and screen image data of the controlled terminal is acquired, the screen image data is sent to the control terminal by using the data channel, operation information that is sent by the control terminal by using the control channel is received, and a corresponding control operation is performed according to the operation information. In this way, two independent channels are used to transmit control information and the screen image data between two terminals, which avoids a problem that a screenshot, of the controlled terminal, displayed on a control terminal side cannot make a response to a user operation on the control terminal side in time because conflicts exist between screen data and the operation information in transmission logic and transmission time, thereby achieving objectives of improving a control effect and user experience.

Figure 20:
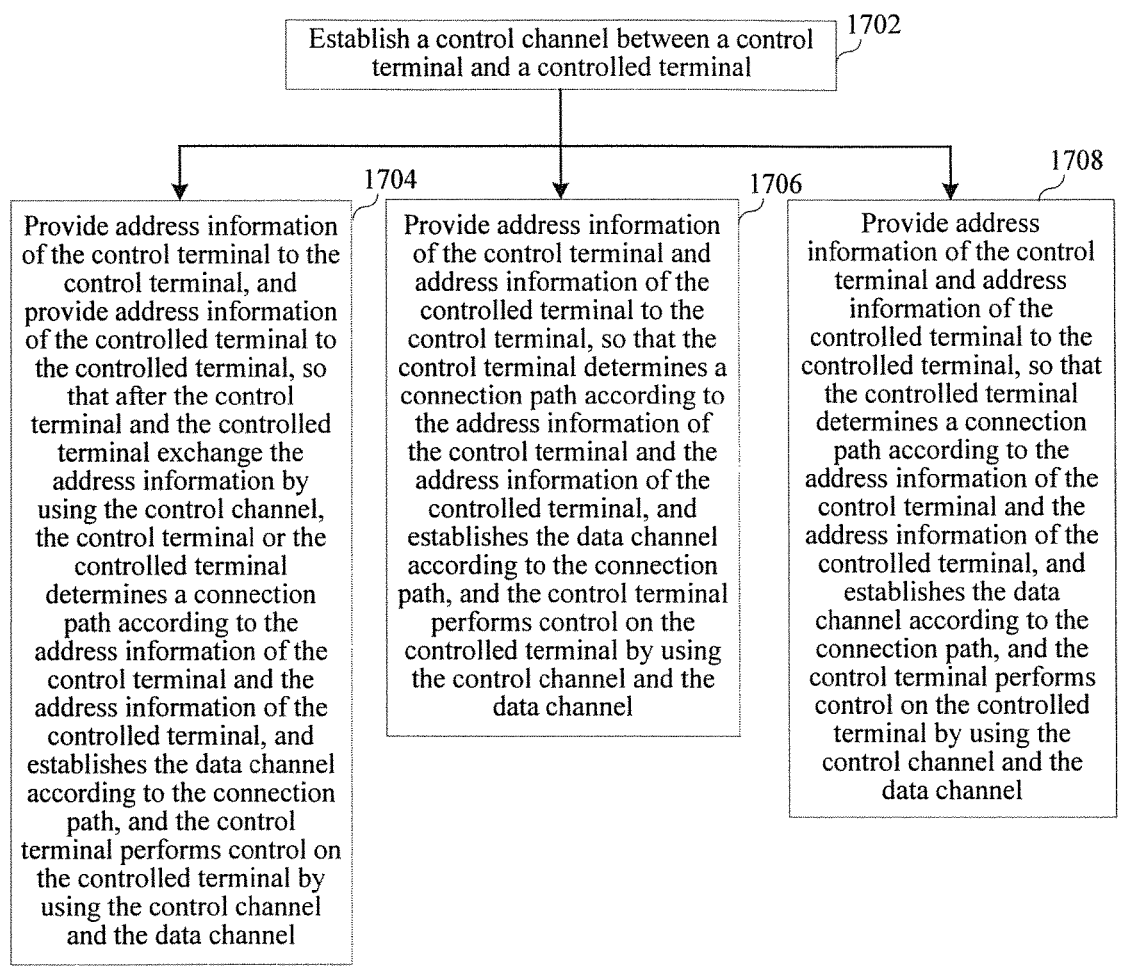
FIG. 20 is a method flowchart of a terminal control method according to an embodiment of the present invention.

Refer to FIG. 20, which is a method flowchart of a terminal control method according to an embodiment of the present invention. The method is used to establish, in the server shown in any one of FIG. 12 to FIG. 15, a connection between the control terminal shown in FIG. 1, FIG. 2, FIG. 6 or FIG. 7 and the controlled terminal shown in any one of FIG. 8 to FIG. 11, so that the control terminal performs remote control on the controlled terminal, where the control terminal and the controlled terminal may be mobile terminals each having a display unit and having a same operation mode, such as smartphones, tablet computers, and e-book readers. The method may include:

Step 1702: Establish a control channel between a control terminal and a controlled terminal.

Step 1704: Provide address information of the control terminal to the control terminal, and provide address information of the controlled terminal to the controlled terminal, so that after the control terminal and the controlled terminal exchange the address information by using the control channel, the control terminal or the controlled terminal determines a connection path according to the address information of the control terminal and the address information of the controlled terminal, and establishes the data channel according to the connection path, and the control terminal performs control on the controlled terminal by using the control channel and the data channel.

Step 1706: Provide address information of the control terminal and address information of the controlled terminal to the control terminal, so that the control terminal determines a connection path according to the address information of the control terminal and the address information of the controlled terminal, and establishes the data channel according to the connection path, and the control terminal performs control on the controlled terminal by using the control channel and the data channel.

Step 1708: Provide address information of the control terminal and address information of the controlled terminal to the controlled terminal, so that the controlled terminal determines a connection path according to the address information of the control terminal and the address information of the controlled terminal, and establishes the data channel according to the connection path, and the control terminal performs control on the controlled terminal by using the control channel and the data channel.

In conclusion, according to the method provided in this embodiment of the present invention, a control channel and a data channel between a control terminal and a controlled terminal are established; and the control terminal performs control on the controlled terminal by using the control channel and the data channel. In this way, two independent channels are used to transmit control information and screen image data between two terminals, which avoids a problem that a screenshot, of the controlled terminal, displayed on a control terminal side cannot make a response to a user operation on the control terminal side in time because conflicts exist between screen data and operation information in transmission logic and transmission time, thereby achieving objectives of improving a control effect and user experience.

Figure 21:
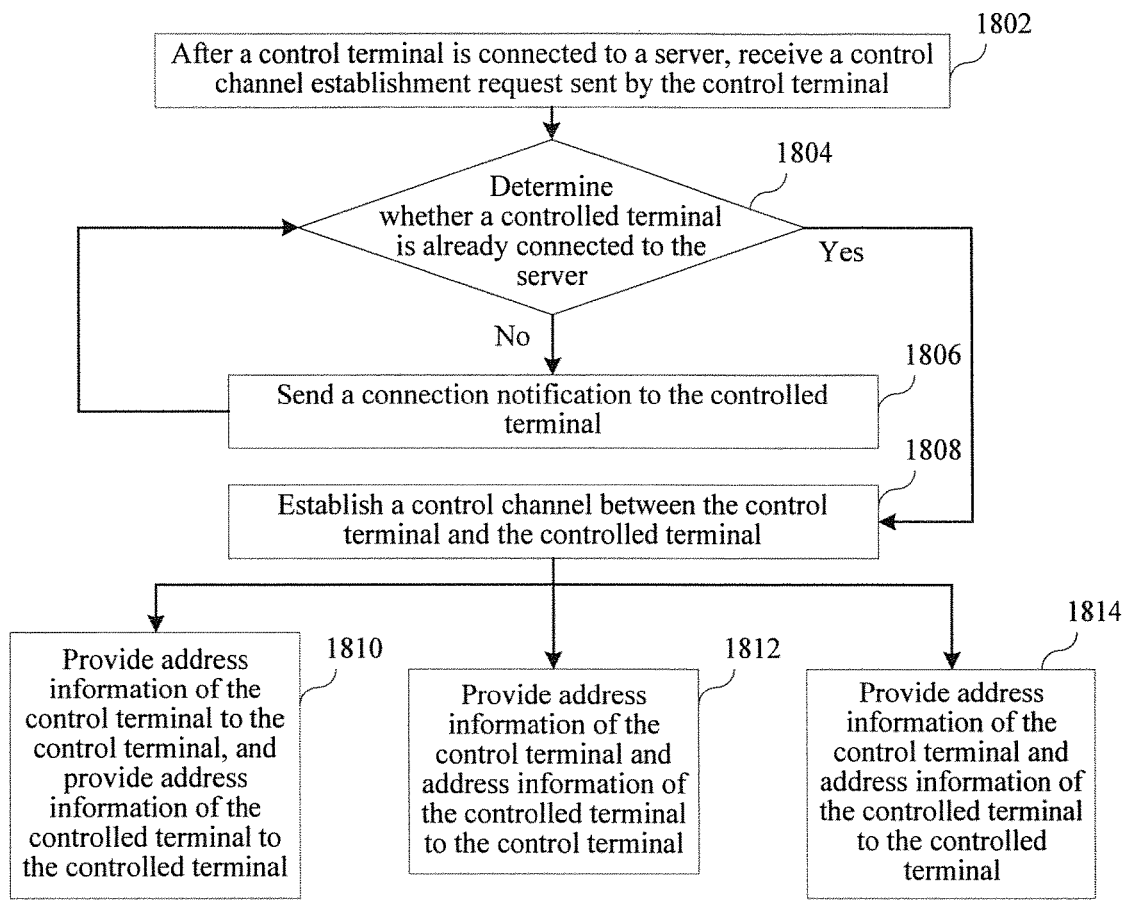
FIG. 21 is a method flowchart of a terminal control method according to another embodiment of the present invention.

Refer to FIG. 21, which is a method flowchart of a terminal control method according to another embodiment of the present invention. The method is used to establish, in the server shown in any one of FIG. 12 to FIG. 15, a connection between the control terminal shown in FIG. 1, FIG. 2, FIG. 6 or FIG. 7 and the controlled terminal shown in any one of FIG. 8 to FIG. 11, so that the control terminal performs remote control on the controlled terminal, where the control terminal and the controlled terminal may be mobile terminals each having a display unit and having a same operation mode, such as smartphones, tablet computers, and e-book readers. The method may include:

Step 1802: After a control terminal is connected to the server, receive a control channel establishment request sent by the control terminal.

Step 1804: Determine whether a controlled terminal is already connected to the server; and if the controlled terminal is already connected to the server, go to step 1806; otherwise, go to step 1808.

Step 1806: Send a connection notification to the controlled terminal, and return to step 1804.

Step 1808: Establish the control channel between the control terminal and the controlled terminal.

For a specific procedure of establishing the control channel between the control terminal and the controlled terminal by the server, refer to the descriptions in the embodiment shown in FIG. 2, and details are no longer described herein.

Step 1810: Provide address information of the control terminal to the control terminal, and provide address information of the controlled terminal to the controlled terminal.

Step 1812: Provide address information of the control terminal and address information of the controlled terminal to the control terminal.

Step 1814: Provide address information of the control terminal and address information of the controlled terminal to the controlled terminal.

For a procedure in which the server provides the address information to the control terminal and/or the controlled terminal, so that the control terminal and/or the controlled terminal establishes a data channel and a procedure in which the control terminal performs remote control on the controlled terminal by using the control channel and the data channel, refer to the descriptions in the embodiment shown in FIG. 2, and details are no longer described herein.

In conclusion, according to the method provided in this embodiment of the present invention, a control channel and a data channel are established between a control terminal and a controlled terminal; and the control terminal performs control on the controlled terminal by using the control channel and the data channel. In this way, two independent channels are used to transmit control information and screen image data between two terminals, which avoids a problem that a screenshot, of the controlled terminal, displayed on a control terminal side cannot make a response to a user operation on the control terminal side in time because conflicts exist between screen data and operation information in transmission logic and transmission time, thereby achieving objectives of improving a control effect and user experience.

Figure 22:
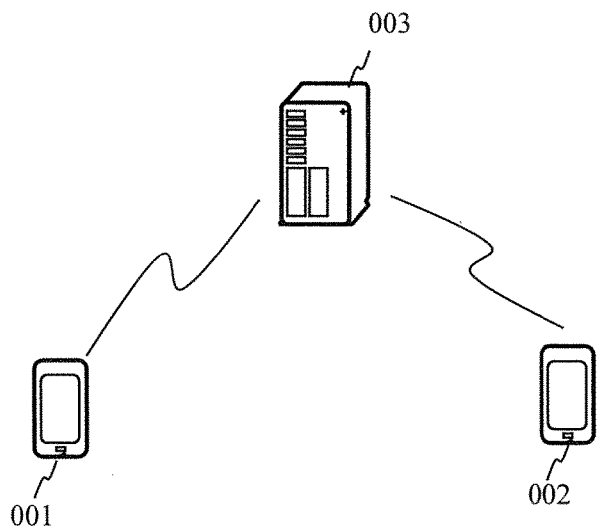
FIG. 22 is a system composition diagram of a terminal control system according to an embodiment of the present invention.

An embodiment of the present invention provides a system composition diagram of a terminal control system. Referring to FIG. 22, the terminal control system is used to perform remote control among a control terminal, a controlled terminal, and a server, where the control terminal and the controlled terminal may be mobile terminals such as smartphones, tablet computers, or e-book readers. The terminal control system may include:

the control terminal 001 shown in FIG. 1, FIG. 2, FIG. 6 or FIG. 7, the controlled terminal 002 shown in any one of FIG. 8 to FIG. 11, and the server 003 shown in any one of FIG. 12 to FIG. 15.

In conclusion, for the terminal control system provided in this embodiment of the present invention, a control terminal establishes a control channel and a data channel to a controlled terminal, receives screen image data that is sent by the controlled terminal by using the data channel, displays a screenshot of the controlled terminal according to the screen image data, generates corresponding operation information according to an operation that is based on the screenshot, and sends the operation information to the controlled terminal by using the control channel, so that the controlled terminal performs a corresponding control operation according to the operation information. In this way, two independent channels are used to transmit control information and the screen image data between two terminals, which avoids a problem that the screenshot, of the controlled terminal, displayed on a control terminal side cannot make a response to a user operation on the control terminal side in time because conflicts exist between screen data and the operation information in transmission logic and transmission time, thereby achieving objectives of improving a control effect and user experience.

It should be noted that when the control terminal provided in the foregoing embodiments performs remote control on a controlled terminal, division of the foregoing function modules is merely used as an example for description. In an actual application, the foregoing functions may be allocated to different function modules and implemented according to a requirement. That is, an internal structure of the terminal is divided into different function modules to implement all or some of the functions described above. In addition, the control terminal, the controlled terminal, and the server provided in the foregoing embodiments share a same concept as the embodiments of the terminal control method, and for a specific implementation process thereof, refer to the method embodiments for details, which are no longer described herein.

The sequence numbers of the foregoing embodiments of the present invention are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. A control terminal, comprising:
   a bus;
   a memory coupled to the bus and configured to to store instructions;
   a processor coupled to the bus and configured to execute the stored instructions;
   a transmitter coupled to the bus;
   a receiver coupled to the bus;
   wherein the processor is configured to:
      control the receiver and the transmitter to establish a control channel to a controlled terminal via a server;
      control the receiver and the transmitter to acquire address information of the control terminal from the server, wherein the address information comprises a local address, a mapping address of network address translation (NAT), and a relay address of traversal using relays around NAT (TURN);

control the receiver and the transmitter to acquire address information of the controlled terminal from the server or the controlled terminal;

determine a connection path according to the address information of the control terminal and the address information of the controlled terminal; and control the receiver and the transmitter to establish a data channel according to the connection path;

wherein the receiver is configured to receive screen image data that is sent by the controlled terminal using the data channel, wherein the screen image data indicates a screenshot of the controlled terminal; and wherein the processor is further configured to:

display the screenshot of the controlled terminal on a display device according to the screen image data, generate corresponding operation information according to an operation that is based on the screenshot, and control the transmitter to send the operation information to the controlled terminal using the control channel, the operation information enabling the controlled terminal to perform a corresponding control operation according to the operation information.

2. The control terminal according to claim 1, wherein:

the operation information comprises at least one of touch information, button information, and voice information; and the processor is configured to:

when the operation information is touch information, monitor a touch event corresponding to the operation, and generate the operation information according to the touch event, when the operation information is button information, determine a button type corresponding to the operation, and generate the operation information comprising an identifier corresponding to the button type, and when the operation information is voice information, recognize a text from a voice corresponding to the operation, retrieve a control instruction comprised in the text, and generate the operation information comprising an identifier corresponding to the control instruction.

3. The control terminal according to claim 2, wherein the processor is configured to:

serialize the touch event into a byte stream, and generate the operation information comprising the byte stream; or retrieve key information of the touch event, encode the key information into a specified-format file, and generate the operation information comprising the specified-format file, wherein the key information comprises at least one of an event type, touch coordinates, and touch force.

4. The control terminal according to claim 1, wherein the processor is configured to:

combine the address information of the control terminal and the address information of the controlled terminal into an address pair;

perform a connectivity test on the address pair; and determine the connection path according to a result of the connectivity test.

5. A controlled terminal, comprising:

a bus;

a memory coupled to the bus and configured to store instructions;

a processor coupled to the bus and configured to executed the stored instructions;

a transmitter coupled to the bus;

a receiver coupled to the bus;

wherein the processor is configured to:

control the receiver and the transmitter to establish a control channel to a control terminal via a server;

control the receiver and the transmitter to acquire address information of the controlled terminal from the server, wherein the address information comprises a local address, a mapping address of network address translation (NAT), and a relay address of traversal using relays around NAT (TURN);

control the receiver and the transmitter to acquire address information of the control terminal from the server or the control terminal;

determine a connection path according to the address information of the control terminal and the address information of the controlled terminal; and control the receiver and the transmitter to establish a data channel according to the connection path;

acquire screen image data indicating a screenshot of the controlled terminal; and control the transmitter to send the screen image data to the control terminal using the data channel, the screen image data enabling the control terminal to display the screenshot of the controlled terminal according to the screen image data;

wherein the receiver is configured to receive operation information that is sent by the control terminal using the control channel, wherein the operation information is information generated by the control terminal according to an operation that is based on the screenshot; and wherein the processor is further configured to perform a corresponding control operation according to the operation information.

6. The controlled terminal according to claim 5, wherein:

the operation information comprises at least one of touch information, button information, and voice information; and the processor is configured to:

when the operation information is touch information, restore, according to the operation information, a touch event corresponding to a touch operation, and perform the control operation according to the touch event, when the operation information is button information, determine, according to an identifier comprised in the operation information, a button type corresponding to a button operation, and perform the control operation according to the button type, and when the operation information is voice information, determine, according to an identifier comprised in the operation information, a control instruction corresponding to a voice operation, and perform the control operation according to the control instruction.

7. The controlled terminal according to claim 6, wherein the processor is configured to:

deserialize a byte stream comprised in the operation information, to restore the touch event; or retrieve key info illation of the touch event from a specified-format file comprised in the operation information, and restore the touch event according to the key information, wherein the key information comprises at least one of an event type, touch coordinates, and touch force.

8. A terminal control method for use in a control terminal, the method comprising:
  establishing a control channel to a controlled terminal via a server;
  acquiring address information of the control terminal from the server, wherein the address information comprises a local address, a mapping address of network address translation (NAT), and a relay address of traversal using relays around NAT (TURN);
  acquiring address information of the controlled terminal from the server or the controlled terminal;
  determining a connection path according to the address information of the control terminal and the address information of the controlled terminal;
  establishing a data channel according to the connection path;
  receiving screen image data that is sent by the controlled terminal using the data channel, wherein the screen image data to indicates a screenshot of the controlled terminal;
  displaying the screenshot of the controlled terminal according to the screen image data;
  generating corresponding operation information according to an operation that is based on the screenshot; and
  sending the operation information to the controlled terminal using the control channel, the operation information enabling the controlled terminal to perform a corresponding control operation according to the operation information.

9. The method according to claim 8, wherein:
the operation information comprises at least one of touch information, button information, and voice information; and
generating the corresponding operation information according to an operation that is based on the screenshot comprises:
  when the operation information is touch information, monitoring to a touch event corresponding to the operation, and generating the operation information according to the touch event,
  when the operation information is button information, determining a button type corresponding to the operation, and generating the operation information comprising an identifier corresponding to the button type, and
  when the operation information is voice information, recognizing a text from a voice corresponding to the operation, retrieving a control instruction comprised in the text, and generating the operation information comprising an identifier corresponding to the control instruction.

10. The method according to claim 9, wherein generating the operation information according to the touch event comprises:
  serializing the touch event into a byte stream, and generating the operation information comprising the byte stream; or
  retrieving key information of the touch event, encoding the key information into a specified-format file, and generating the operation information comprising the specified-format file, wherein the key information comprises at least one of an event type, touch coordinates, and touch force.

11. The method according to claim 8, wherein determining the connection path according to the address information of the control terminal and the address information of the controlled terminal comprises:
  combining the address information of the control terminal and the address information of the controlled terminal into an address pair, performing a connectivity test on the address pair, and determining the connection path according to a result of the connectivity test.

* * * * *